US012447742B2

(12) United States Patent
Kim et al.

(10) Patent No.: US 12,447,742 B2
(45) Date of Patent: Oct. 21, 2025

(54) INKJET PRINTING APPARATUS

(71) Applicant: Samsung Display Co., LTD., Yongin-si (KR)

(72) Inventors: Kyong Sub Kim, Yongin-si (KR); Jae Hoon Kim, Yongin-si (KR); Sang Hoon Park, Yongin-si (KR); Dong Woo Shin, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 179 days.

(21) Appl. No.: 18/300,446

(22) Filed: Apr. 14, 2023

(65) Prior Publication Data

US 2023/0373211 A1 Nov. 23, 2023

(30) Foreign Application Priority Data

May 17, 2022 (KR) ........................ 10-2022-0060239

(51) Int. Cl.
*B41J 2/14* (2006.01)

(52) U.S. Cl.
CPC .. *B41J 2/14201* (2013.01); *B41J 2002/14419* (2013.01)

(58) Field of Classification Search
CPC .......... B41J 2/14201; B41J 2002/14419; B41J 2202/09; B41J 2202/11; B41J 2202/12; B41J 2/14; H10K 59/00; H10K 71/135
See application file for complete search history.

(56) References Cited

U.S. PATENT DOCUMENTS

2013/0070030 A1 3/2013 Kusinoki et al.

FOREIGN PATENT DOCUMENTS

| | | | |
|---|---|---|---|
| JP | 2004-174950 | 6/2004 | |
| JP | 2020-75449 | 5/2020 | |
| WO | WO-2021015385 A1 * | 1/2021 | ................ B41J 2/06 |

OTHER PUBLICATIONS

Ryu, An Na et al., "Inkjet Printing Device, Method for Aligning Bipolar Element, and Method for Manufacturing Display Device" (WO 2021/015385 A1), Jan. 28, 2021, Mode For Invention: Paragraphs 002-0013, 0021-0022, 0036]. (Year: 2021).*
Yoshio TAKEUCHI et al., "Features of Shear Mode Piezo Inkjet Head", Nov. 15, 2004, pp. 509-514, vol. 43, No. 6.

* cited by examiner

*Primary Examiner* — Lisa Solomon
(74) *Attorney, Agent, or Firm* — Womble Bond Dickinson (US) LLP

(57) ABSTRACT

An inkjet printing apparatus may include a stage on which a substrate is seated; a nozzle part disposed above the stage and spraying an ink onto the substrate, the ink containing a solvent and solid substances; and a head part that supplies the ink to the nozzle part. The nozzle part includes an internal flow path extended in a first direction, through which the ink is supplied from the head prat; and an inlet in which an entrance area is defined. The ink is introduced in a second direction intersecting the first direction from the internal flow path through the entrance area. The inlet includes an inclined surface adjacent to the entrance area and defining the entrance area; and a flat surface parallel to the first direction. An angle between the inclined surface and the flat surface is an acute angle.

12 Claims, 22 Drawing Sheets

INKJET PRINTING APPARATUS

CROSS-REFERENCE TO RELATED APPLICATION(S)

This application claims priority to and benefits of Korean Patent Application No. 10-2022-0060239 under 35 U.S.C. § 119, filed in the Korean Intellectual Property Office on May 17, 2022, the entire contents of which are incorporated herein by reference.

BACKGROUND

1. Technical Field

The disclosure relates to an inkjet printing apparatus capable of increasing lifetime of a head part.

2. Description of the Related Art

Display devices become more and more important as multimedia technology evolves. Accordingly, a variety of types of display devices such as organic light-emitting display (OLED) devices and liquid-crystal display (LCD) devices are currently used.

Display devices include a display panel such as an organic light-emitting display panel and a liquid-crystal display panel for displaying images. Among them, light-emitting display panel may include light-emitting elements. For example, light-emitting diodes (LEDs) may include an organic light-emitting diode (OLED) using an organic material as a fluorescent material, and an inorganic light-emitting diode using an inorganic material as a fluorescent material.

An inorganic light-emitting diode using an inorganic semiconductor as the fluorescent material has advantages in that it has durability in high-temperature environments and that it has a higher efficiency of blue light than organic light-emitting diodes.

It is to be understood that this background of the technology section is, in part, intended to provide useful background for understanding the technology. However, this background of the technology section may also include ideas, concepts, or recognitions that were not part of what was appreciated by those skilled in the pertinent art prior to a corresponding effective filing date of the subject matter disclosed herein.

SUMMARY

Embodiments provide an inkjet printing apparatus capable of increasing lifetime of a head.

However, embodiments of the disclosure are not limited to those set forth herein. The above and other embodiments will become more apparent to one of ordinary skill in the art to which the disclosure pertains by referencing the detailed description of the disclosure given below.

According to an embodiment of the disclosure, an inkjet printing apparatus comprises a stage on which a substrate is seated; a nozzle part disposed above the stage and spraying an ink onto the substrate, the ink containing a solvent and solid substances; and a head part that supplies the ink to the nozzle part. The nozzle part includes an internal flow path extended in a first direction, through which the ink is supplied from the head part; and an inlet in which an entrance area is defined. The ink is introduced in a second direction intersecting the first direction from the internal flow path through the entrance area. The inlet includes an inclined surface adjacent to the entrance area and defining the entrance area; and a flat surface parallel to the first direction. An angle between the inclined surface and the flat surface is an acute angle.

In an embodiment, the nozzle part may further comprise a pressure part disposed adjacent to the inlet in the second direction and defining a pressure area that supplies a pressure to the ink introduced from the entrance area.

In an embodiment, the pressure part may comprise a piezoelectric element.

In an embodiment, the inkjet printing apparatus may further comprise an outlet adjacent to the pressure part in the second direction to define an exit area. The ink may be discharged from the exit area by the pressure applied in the pressure area.

In an embodiment, wherein a width of the entrance area may increase in the second direction.

In an embodiment, the entrance area may comprise an end adjacent to the internal flow path; and an opposite end adjacent to the pressure area. An area of the end of the entrance area may be smaller than an area of the opposite end of the entrance area.

In an embodiment, the ink may sequentially pass through the internal flow path, the entrance area, the pressure area, and the exit area.

In an embodiment, the nozzle part may further include a base in which the internal flow path and the inlet are located.

In an embodiment, the internal flow path may penetrate through the base.

In an embodiment, an edge of the internal flow path may be defined by the base and the flat surface of the inlet.

In an embodiment, the inclined surface may comprise a first inclined surface having an end in contact with the flat surface and an opposite end; and a second inclined surface in contact with the opposite end of the first inclined surface.

In an embodiment, the first inclined surface may be more inclined toward the entrance area than the second inclined surface.

According to an embodiment of the disclosure an inkjet printing apparatus comprises a stage on which a substrate is seated; a nozzle part disposed above the stage and spraying an ink onto the substrate, the ink containing a solvent and solid substances; and a head part that supplies the ink to the nozzle part. The nozzle part may include an internal flow path extended in a first direction, through which the ink is supplied from the head part; and an entrance area. The ink is introduced in a second direction intersecting the first direction from the internal flow path through the entrance area. A width of the entrance area increases in the second direction.

In an embodiment, the nozzle part may further include a pressure area disposed adjacent to the entrance area in the second direction and applying pressure to the ink introduced from the entrance area.

In an embodiment, the nozzle part may further comprise an exit area disposed adjacent to the pressure area in the second direction. The ink may be discharged from the exit area by the pressure applied in the pressure area.

In an embodiment, the entrance area may comprise an end adjacent to the internal flow path; and an opposite end adjacent to the pressure area. An area of the end of the entrance area may be smaller than an area of the opposite end of the entrance area.

In an embodiment, the ink may sequentially pass through the internal flow path, the entrance area, the pressure area, and the exit area.

In an embodiment, the nozzle part may further comprise an inlet adjacent to the entrance area. The inlet may include an inclined surface defining the entrance area; and a flat surface parallel to the first direction. An angle between the inclined surface and the flat surface of the inlet may be an acute angle.

In an embodiment, the inclined surface may comprise a first inclined surface having an end in contact with the flat surface; and a second inclined surface in contact with an opposite end of the first inclined surface.

In an embodiment, the nozzle part may further comprise a pressure part adjacent to the pressure area. The pressure part may comprise a piezoelectric element.

According to an embodiment of the disclosure, reduction in lifetime of a head of an inkjet printing apparatus due to precipitation of solid particles may be prevented.

It should be noted that effects of the disclosure are not limited to those described above and other effects of the disclosure will be apparent to those skilled in the art from the following descriptions.

BRIEF DESCRIPTION OF THE DRAWINGS

An additional appreciation according to the embodiments of the disclosure will become more apparent by describing in detail the embodiments thereof with reference to the attached drawings, wherein.

DETAILED DESCRIPTION OF THE EMBODIMENTS

Figure 1:
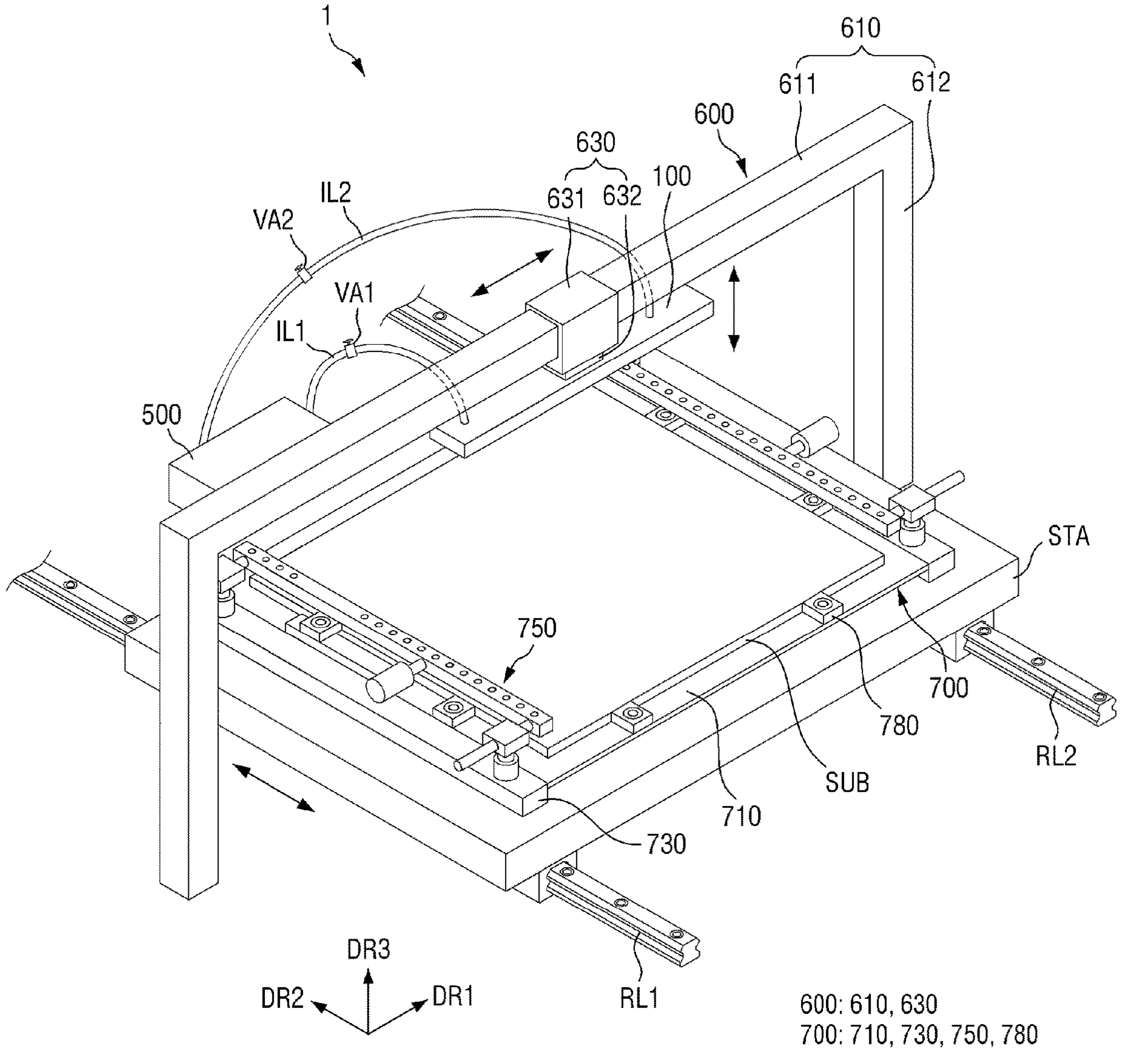
FIG. 1 is a schematic perspective view showing an inkjet printing apparatus according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order.

When an element, such as a layer, is referred to as being "on," "connected to," or "coupled to" another element or layer, it may be directly on, connected to, or coupled to the other element or layer or intervening layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, like reference numbers denote like elements.

Although the terms "first," "second," and the like may be used herein to describe various elements, these elements should not be limited by these terms. These terms are used to distinguish one element from another element. Thus, a first element discussed below could be termed a second element without departing from the teachings of the disclosure. Similarly, the second element could also be termed the first element.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a" and "an" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the disclosure. Further, the blocks, units, and/or modules of some embodiments may be physically combined into more complex blocks, units, and/or modules without departing from the scope of the disclosure.

The terms "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Features of each of various embodiments of the disclosure may be partially or entirely combined with each other and may technically variously interwork with each other, and respective embodiments may be implemented independently of each other or may be implemented together in association with each other.

Hereinafter, embodiments of the disclosure will be described with reference to the accompanying drawings.

Figure 2:
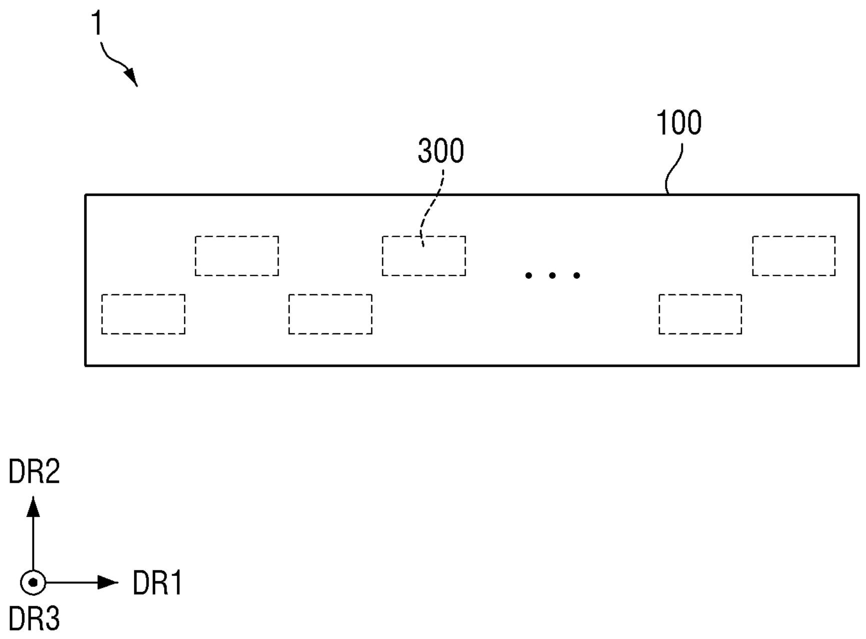
FIG. 2 is a schematic plan view of an inkjet head unit of the inkjet printing apparatus according to the embodiment of FIG. 1 as viewed from the third direction.
Figure 3:
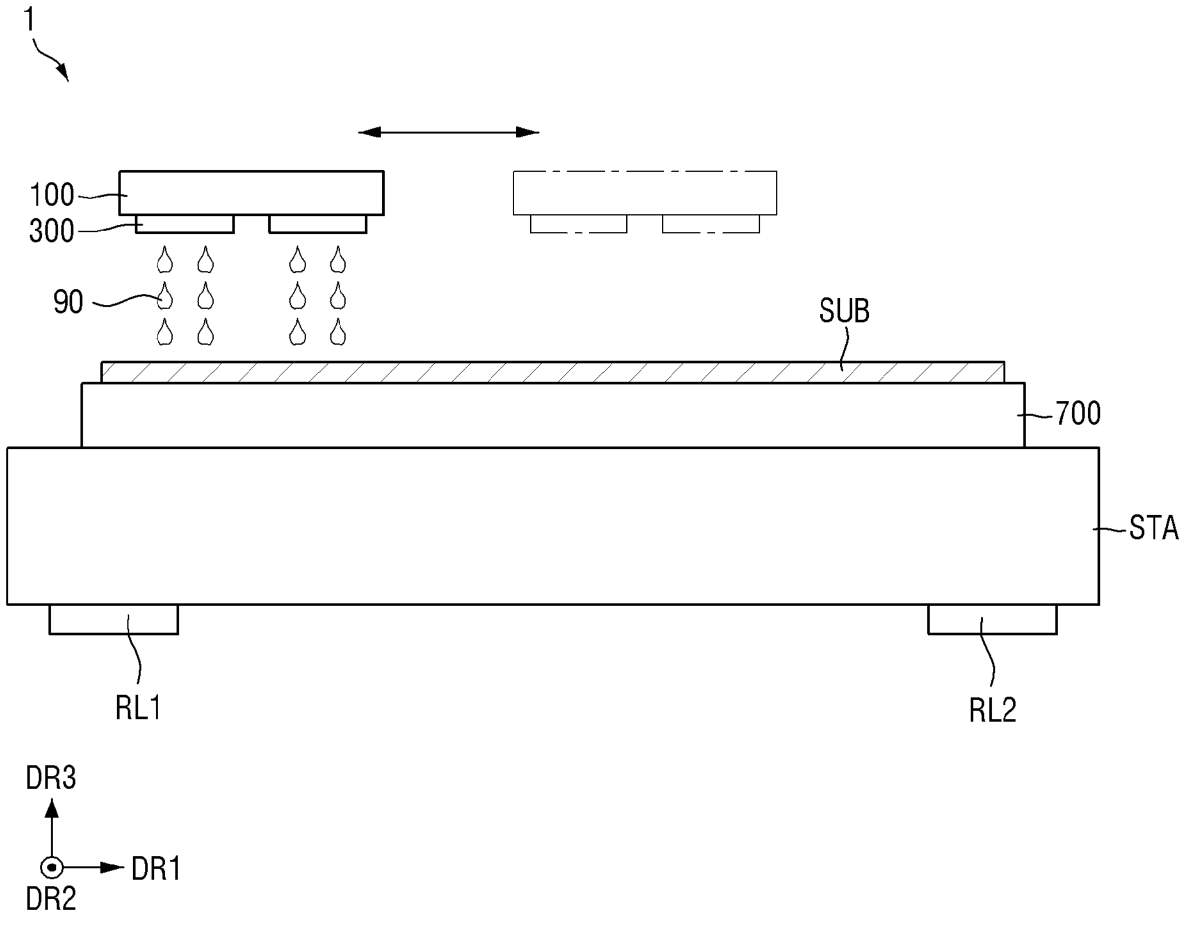
FIG. 3 is a view schematically showing the operation of the inkjet head unit of the inkjet printing apparatus according to the embodiment of FIG. 1.

FIG. 1 is a schematic perspective view showing an inkjet printing apparatus according to an embodiment of the disclosure. FIG. 2 is a schematic plan view of an inkjet head part of the inkjet printing apparatus according to the embodiment of FIG. 1 as viewed from the third direction. FIG. 3 is a view schematically showing the operation of the inkjet head part of the inkjet printing apparatus according to the embodiment of FIG. 1.

In FIG. 1, a first direction DR1, a second direction DR2, and a third direction DR3 may be defined. The first direction DR1 and the second direction DR2 may be perpendicular to each other, the first direction DR1 and the third direction DR3 may be perpendicular to each other, and the second direction DR2 and the third direction DR3 may be perpendicular to each other. The first direction DR1 may refer to a horizontal direction in the drawings, the second direction DR2 may refer to a vertical direction in the drawings, and the third direction DR3 may refer to an up-and-down direction (or a thickness direction) in the drawings. As used herein, a direction may refer to a direction indicated by an arrow as well as an opposite direction thereto, unless specifically stated otherwise. In case that two opposite directions are distinguished, one of the two directions may be referred to as "one side in the direction," and another direction of the two directions may be referred to as "an opposite side in the direction." In FIG. 1, a side indicated by an arrow of a direction may be referred to as a side in the direction, and an opposite side may be referred to as an opposite side in the direction.

Referring to FIGS. 1 to 3, an inkjet printing apparatus 1 according to an embodiment of the disclosure may include a stage STA, an inkjet head part 100, a base frame 600, an ink storage part 500, a first connecting line IL1, and a second connecting line IL2. A target substrate SUB may be seated on the stage STA. Nozzle parts 300 may be disposed in the inkjet head part 100. The first connecting line IL1 may connect the inkjet head part 100 to the ink storage part 500. The second connecting line IL2 may connect the inkjet head part 100 to the ink storage part 500. The inkjet printing apparatus 1 according to the embodiment of the disclosure may spray an ink 90 onto a target substrate SUB seated on the stage STA using the inkjet head part 100 and the nozzle parts 300.

The stage STA may allow the target substrate SUB to be seated on the stage STA. The stage STA may be disposed on a first rail RL1 extended in the second direction DR2 and a second rail RL2 extended in the second direction DR2. The stage STA may move in the second direction DR2 by a separate moving mechanism on the first rail RL1 and the second rail RL2. Accordingly, the target substrate SUB may also move in the second direction DR2 along the stage STA. The stage STA and the target substrate SUB may move in the second direction DR2 and pass through the inkjet head part 100 disposed above the stage STA and the target substrate SUB. Thus, the ink 90 may be sprayed onto an upper surface of the target substrate SUB. Although the stage STA moves in the second direction DR2 in the drawings, the disclosure is not limited thereto. In some implementations, the inkjet head part 100 may move in the second direction DR2. In the following description, it is assumed that the stage STG moves in the second direction DR2 through the first rail RL1 and the second rail RL2 for convenience of illustration.

The inkjet head part 100 may eject the ink 90 onto the target substrate SUB through the nozzle parts 300. The nozzle parts 300 may be attached to a bottom surface of the inkjet head part 100. The nozzle parts 300 may be disposed such that they are spaced apart from one another on the bottom surface of the inkjet head part 100 and may be arranged in a row or multiple of rows. Although the nozzle parts 300 are arranged in two rows, and the nozzle parts 300 in one of the rows may be staggered with respect to those in another one of the rows in the example shown in FIG. 2, the disclosure is not limited thereto. For example, the nozzle parts 300 may be arranged in more than two rows and may be arranged such that they overlap one another (e.g., in a view or direction) instead of being staggered. In some embodiments, the inkjet head part 100 may have a rectangular shape. However, the disclosure is not limited thereto.

The inkjet head part 100 may be disposed such that it is spaced apart from the target substrate SUB seated on the stage STA in the third direction DR3, and eject the ink 90 onto the upper surface of the target substrate SUB in the third direction DR3. The inkjet head part 100 may be disposed on the base frame 600 and a position of the inkjet head part 100 may be adjusted by a configuration of the base frame 600.

The base frame 600 may have the inkjet head part 100 in which the nozzle parts 300 are disposed and mounted thereon to move the inkjet head part 100, and may define a movement path of the inkjet head part 100. The base frame 600 may include a support 610 and a moving unit 630.

The support 610 of the base frame 600 may include a first support part 611 and second support parts 612. The first support part 611 may hold the inkjet head part 100 in which the nozzle parts 300 is disposed. In some embodiments, the first support part 611 may have a bar shape extended in the first direction DR1, but the disclosure is not limited thereto. The second support parts 612 may hold up the first support part 611 in the third direction DR3. The second support parts 612 may be connected (or extended) to ends (e.g., both ends) of the first support part 611 in the first direction DR1, respectively, and may be extended in the third direction DR3. Accordingly, the first support part 611 and the inkjet head part 100 in which the nozzle parts 300 is disposed may be spaced apart from the stage STA in the third direction DR3.

The second support part 612 connected (or extended) to a side of the first support part 611 in the first direction DR1 and the second support part 612 connected (or extended) to an opposite side of the first support part 611 in the first direction DR1 may be spaced apart from each other in the direction DR1. The stage STA and the substrate SUB may be disposed between the second support part 612 connected (or extended) to the side of the first support part 611 in the first direction DR1 and the second support part 612 connected (or extended) to the opposite side of the first support part 611 in the first direction DR1 which are spaced apart from each other.

The moving unit 630 of the base frame 600 may have two roles. For example, the moving unit 630 of the base frame 600 may have a role to have the inkjet head part 100 mounted thereon and a role to move the inkjet head part 100 in the first direction DR1. The moving unit 630 may include a moving part 631 and a fixing part 632. The moving part 631 may be mounted on the first support part 611 and movable in the first direction DR1. The fixing part 632 may be disposed on the bottom surface of the moving part 631 and have the inkjet head part 100 disposed thereon. The moving part 631 may be disposed on the first support 611 to move in the first direction DR1 on the first support 611. The inkjet head part 100 in which the nozzle parts 300 is disposed may be fixed to the fixing part 632 and move in the first direction DR1 together with the moving part 631.

The ink storage part 500 may store the ink 90 to be supplied to the inkjet head part 100. In some embodiments, the ink storage part 500 may be disposed on the side of the first support 611, but the disclosure is not limited thereto. The ink storage part 500 may be connected (or extended) to the inkjet head part 100 via the first connecting line IL1 and the second connecting line IL2. The ink 90 of the ink storage part 500 may be supplied to the inkjet head part 100 via the first connecting line IL1, and the remaining ink 90 after it is discharged from the inkjet head part 100 may be retrieved back to the ink storage part 500 via the second connecting line IL2. Detailed description of the above-described operation is described below.

The ink 90 may include a solvent 91, and bipolar elements 95 which are solid substances contained in the solvent 91. The ink 90 may be provided as a solution or colloidal state. Each of the bipolar elements 95 may include a first end having a first polarity and a second end having a second polarity. The bipolar elements 95 dispersed in the solvent 91 may be supplied to the inkjet head part 100 and may be discharged therefrom.

In some embodiments, the solvent 91 may include at least one of acetone, water, alcohol, toluene, propylene glycol (PG), and propylene glycol methyl acetate (PGMA). However, the disclosure is not limited thereto.

The inkjet printing apparatus 1 may further include a probe device 700.

The probe device 700 may form an electric field IEL (e.g., refer to FIG. 12) in the target substrate SUB. The probe device 700 may be disposed on the stage STA. The probe device 700 may include a sub-stage 710 supporting the target substrate SUB. For example, the target substrate SUB may be seated on the sub-stage 710 of the probe device 700 disposed on the stage STA.

After the bipolar elements 95 of the ink 90 are sprayed onto the target substrate SUB with orientations (e.g., particular or selectable orientations), the bipolar elements 95 may be aligned in a direction on the target substrate SUB by the electric field IEL generated by the probe device 700. Detailed description thereon is provided below in conjunction with FIGS. 10 to 13.

Hereinafter, an ink circulation system between the ink storage part 500 and the inkjet head part 100 of the inkjet printing apparatus 1 according to the embodiment of the disclosure is described below.

Figure 4:
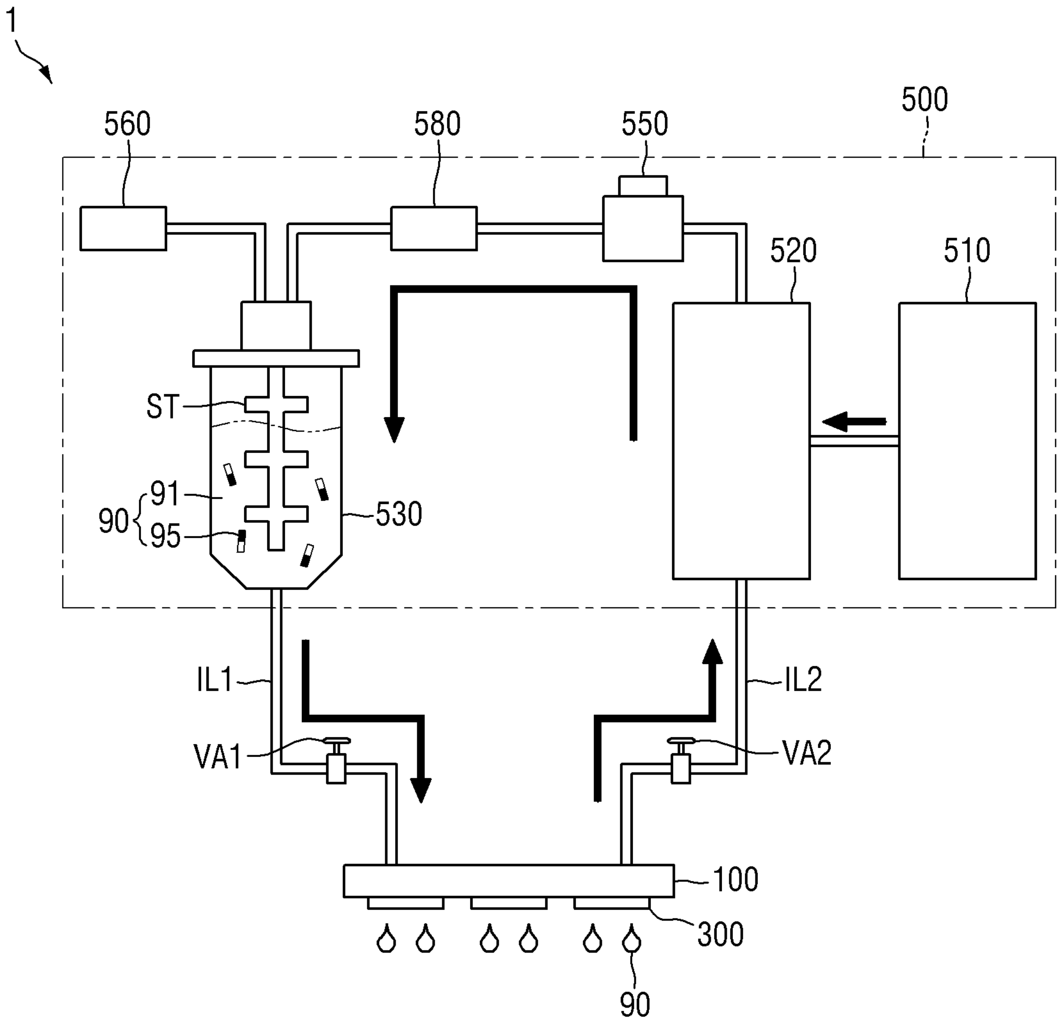
FIG. 4 is a view schematically showing the connection relationship between the ink storage unit and the inkjet head unit of the inkjet printing apparatus according to the embodiment of FIG. 1.

FIG. 4 is a view schematically showing the connection relationship between the ink storage part and the inkjet head part of the inkjet printing apparatus according to the embodiment of FIG. 1.

Referring to FIG. 4, the ink storage part 500 may supply the ink 90 to the inkjet head part 100, and the inkjet head part 100 may discharge the supplied ink 90. A part of the ink 90 supplied to the inkjet head part 100 may be discharged from the inkjet head part 100, and the remainder (or the remaining part) of the ink 90 may be supplied back to the ink storage part 500. For example, the ink 90 may circulate between the ink storage part 500 and the inkjet head part 100 via the first connecting line IL1 and the second connecting line IL2.

In some embodiments, the ink storage part 500 may include a first ink storage 510, a second ink storage 520, a third ink storage 530, a pressure pump 550, a compressor 560, and a flow meter 580. For example, the second ink storage 520, the pressure pump 550, and the third ink storage 530 of the ink storage part 500 may be connected (or extended) to the inkjet head part 100, and they may form a single circulation system.

The first ink storage 510 may prepare the produced ink 90. The ink 90 containing the solvent 91 and the bipolar elements 95 may be prepared in the first ink storage 510, and the ink 90 may be supplied to the circulation system.

The second ink storage 520 may be connected (or extended) to the first ink storage 510, and the prepared ink 90 may be supplied. The second ink storage 520 may retrieve and store the remaining part of the ink 90 via the second connecting line IL2 after the ink 90 is discharged from the inkjet head part 100. The second ink storage 520 may be located between the third ink storage 530 and the inkjet head part 100, and the first ink storage part 510. The second ink storage 520 may be located between the third ink storage 530, the inkjet head part 100, and the first ink storage part 510, the second ink storage 520 may control application of the ink 90 to the third ink storage 530 so that an appropriate amount of the ink 90 is supplied to the third ink storage 530 to facilitate the dispersion of the bipolar elements 95. The ink 90 supplied to the second ink storage 520 may be supplied to the third ink storage 530 via the pressure pump 550.

The pressure pump 550 may transfer power to a fluid so that the ink 90 can be circulated in the circulation system. The flow meter 580 may be disposed between the pressure pump 550 and the third ink storage 530, and the flow meter 580 may measure a flow rate of the ink 90 supplied to the third ink storage 530. The pressure pump 550 may adjust the flow rate of the ink 90 supplied to the third ink storage 530 according to the flow rate of the ink 90 measured by the flow meter 580.

The compressor 560 may adjust a pressure in the third ink storage 530. The compressor 560 may remove gas from an inside of the third ink storage 530 so that it is in a vacuum state. For example, the compressor 560 may introduce an outside inert gas, and the inside of the third ink storage 530 may have a pressure (e.g., a predetermined or selectable pressure). In an embodiment, the compressor 560 may be eliminated (or omitted).

The third ink storage 530 may supply the ink 90 to the inkjet head part 100 via the first connecting line ILL In some embodiments, the third ink storage 530 may include a stirrer, which may be used to disperse the bipolar elements 95 in the ink 90. As the stirrer rotates, the ink 90 supplied to the third ink storage 530 may remain dispersed because the bipolar elements 95 do not sink. For example, the stirrer of the third ink storage 530 may prevent the bipolar elements 95 from sinking to a bottom of the third ink storage 530. Thus, the number of the bipolar elements 95 may be reduced in the ink 90 discharged through the inkjet head part 100. Accordingly, the third ink storage 530 may supply the ink 90 in which the bipolar elements 95 are evenly dispersed to the inkjet head part 100, and the inkjet head part 100 may discharge the ink 90 containing a sufficient amount of the bipolar elements 95.

A first valve VA1 may be disposed on the first connecting line IL1, and a second valve VA2 may be disposed on the second connecting line IL2. The first valve VA1 may regulate (or control) the flow rate of the ink 90 supplied from the ink storage part 500 to the inkjet head part 100, and the second valve VA2 may regulate (or control) the flow rate of the ink 90 retrieved to the ink storage part 500 from the inkjet head part 100.

Hereinafter, a process of discharging the ink 90 is described based on the structure of the nozzle parts 300.

Figure 5:
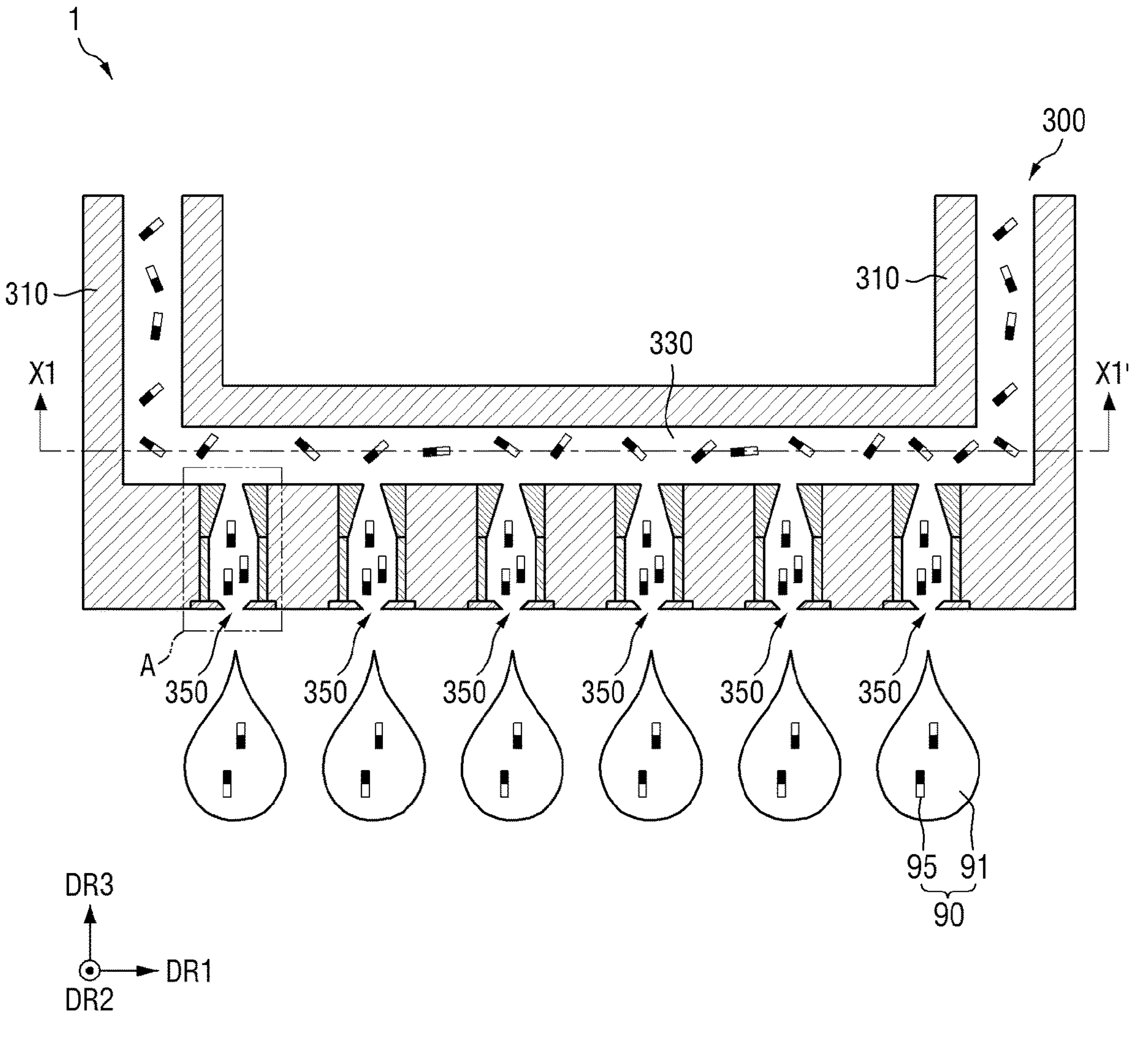
FIG. 5 is a view schematically showing the inside of the inkjet head unit according to the embodiment of FIG. 1.
Figure 6:
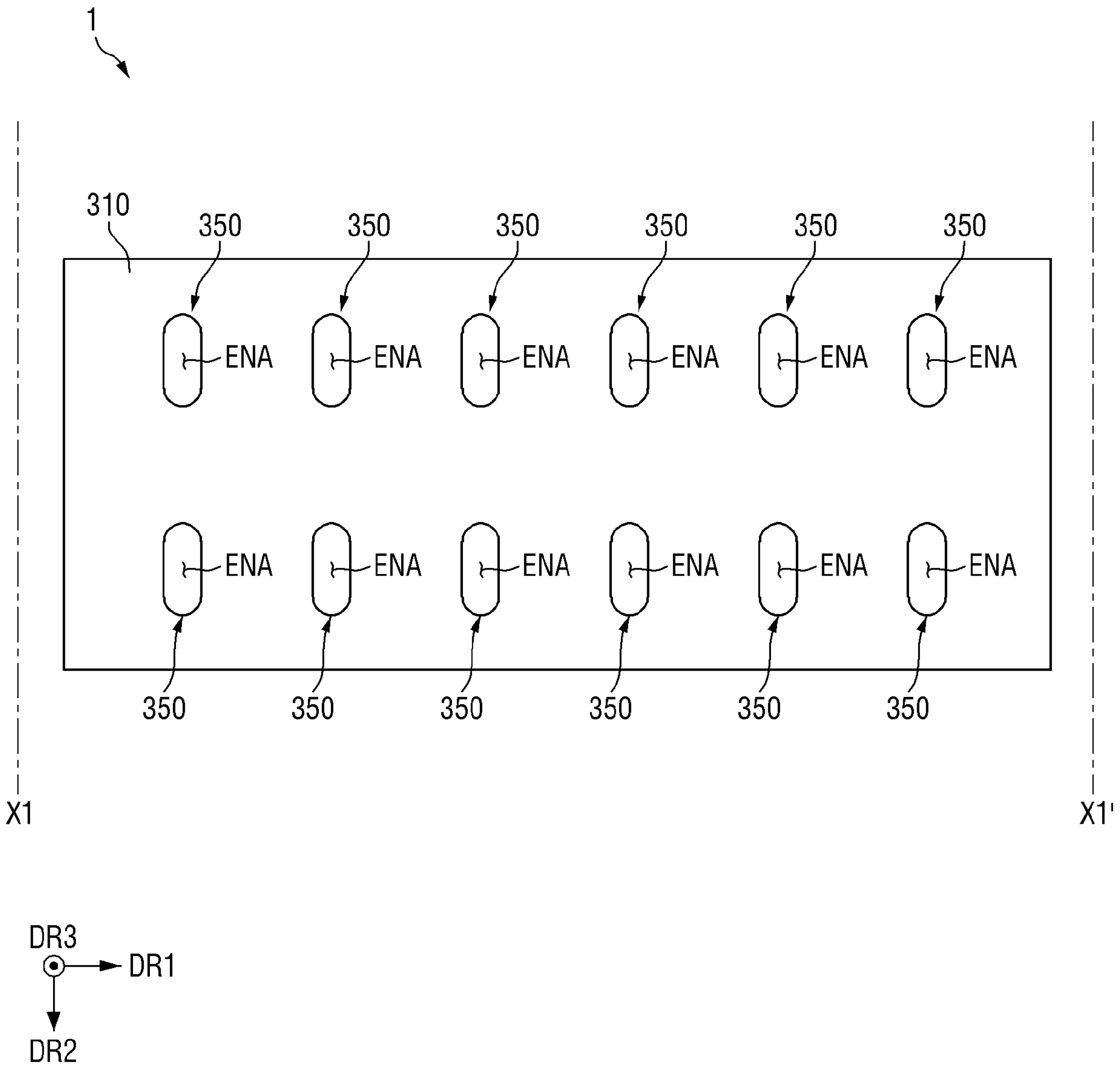
FIG. 6 is a schematic cross-sectional view showing a cross section taken along line X1-X1' of FIG. 5.
Figure 7:
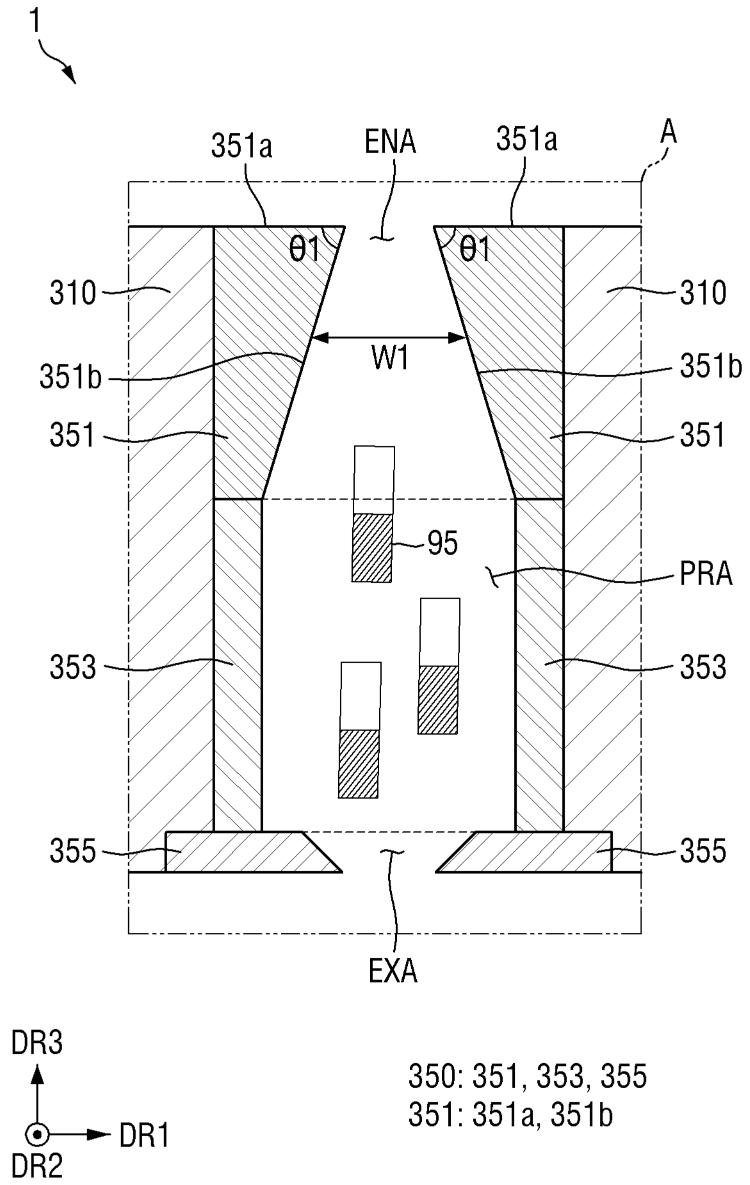
FIG. 7 is a schematic enlarged view of area A of FIG. 5.
Figure 8:
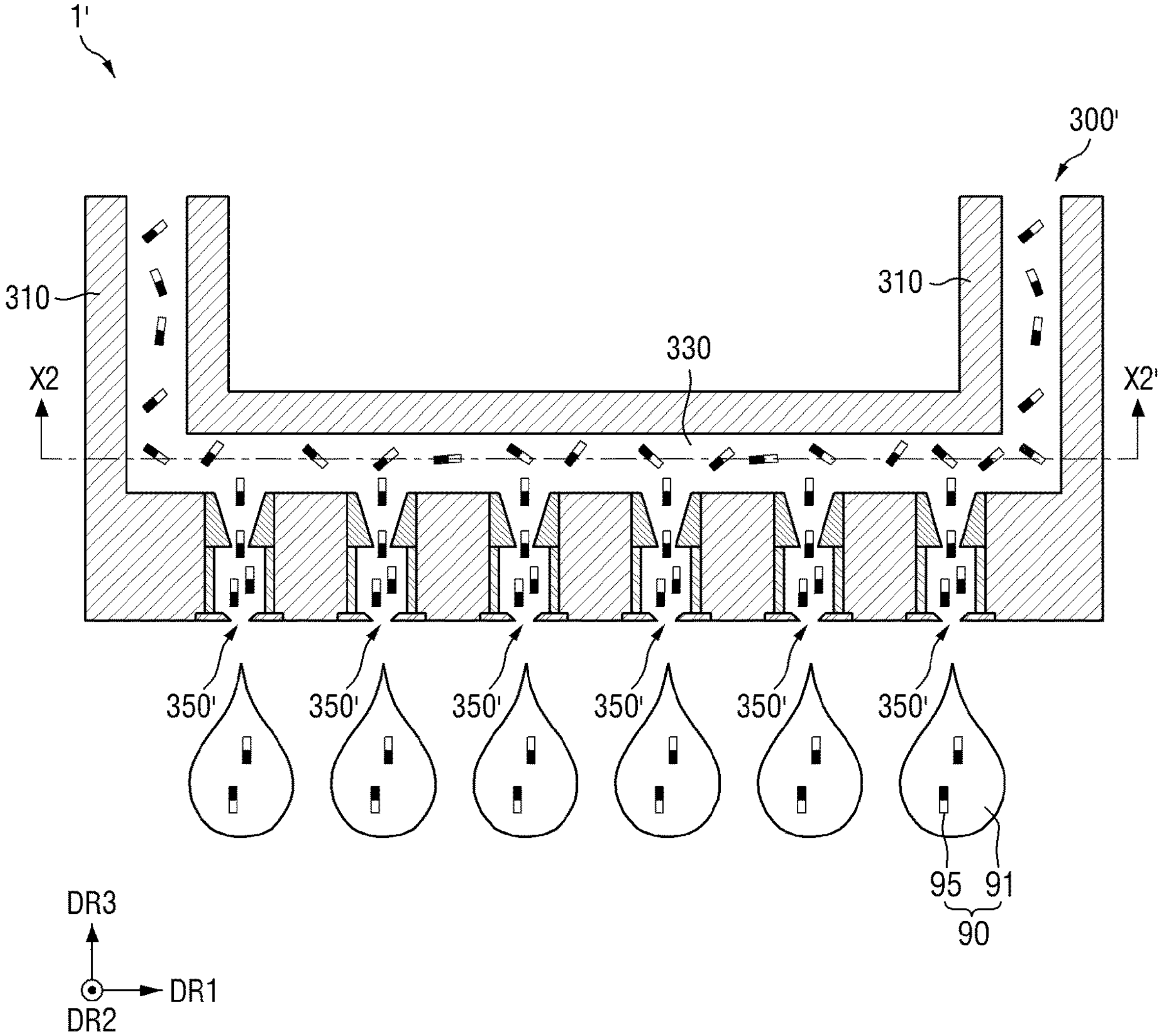
FIG. 8 is a view schematically showing a structure of an inside of an inkjet head unit of an inkjet printing apparatus according to Comparative Example.
Figure 9:
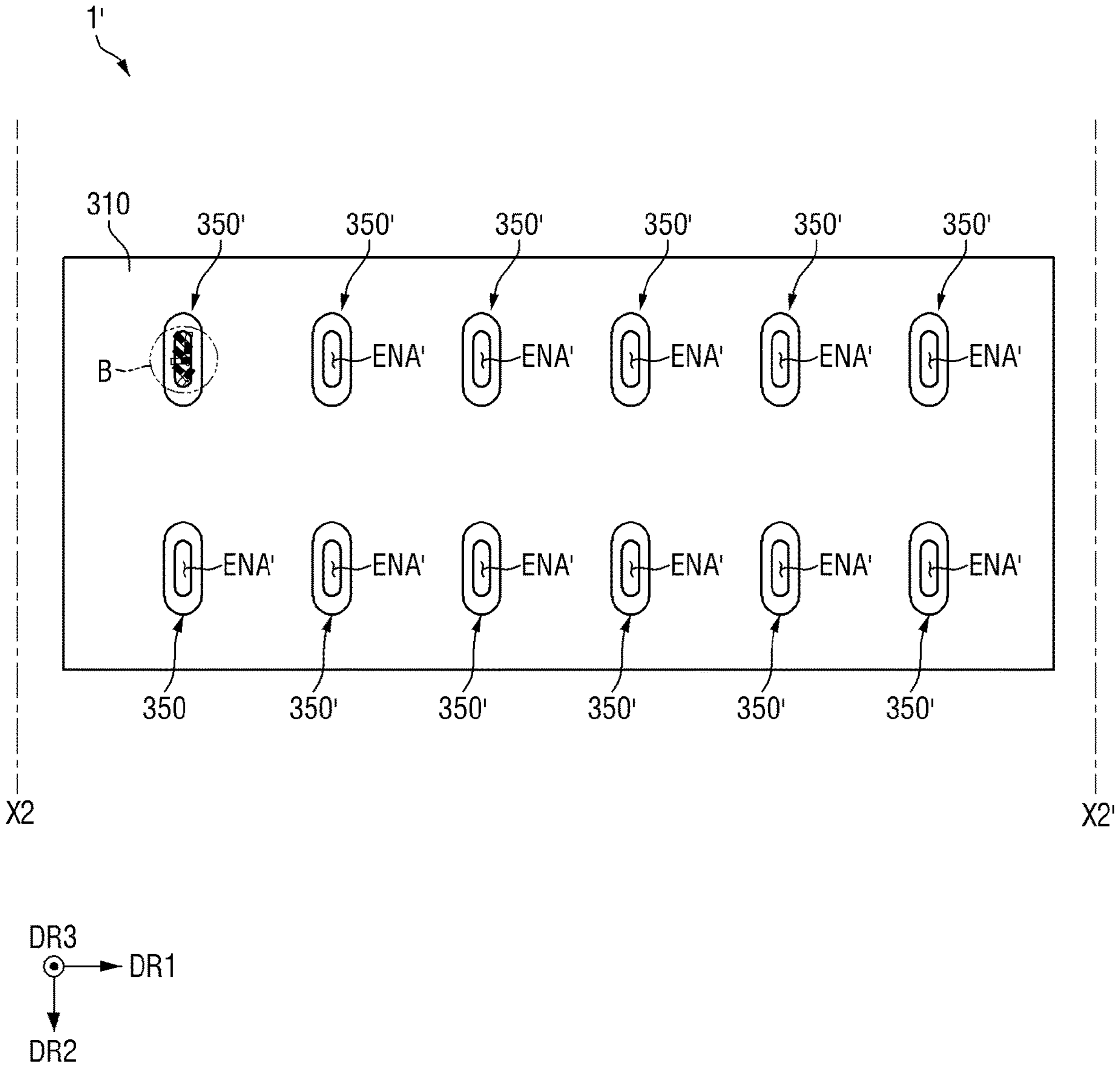
FIG. 9 is a schematic cross-sectional view taken along line X2-X2' of FIG. 8.

FIG. 5 is a view schematically showing the inside of the inkjet head part according to the embodiment of FIG. 1. FIG. 6 is a schematic cross-sectional view showing a cross section taken along line X1-X1' of FIG. 5. FIG. 7 is a schematic enlarged view of area A of FIG. 5. FIG. 8 is a view schematically showing a structure of an inside of an inkjet head part of an inkjet printing apparatus according to Comparative Example. FIG. 9 is a schematic cross-sectional view taken along line X2-X2' of FIG. 8.

Referring to FIGS. 5 to 7, each of the nozzle parts 300 of the inkjet printing apparatus 1 according to the embodiment may include a base 310, an internal flow path 330, and injection holes 350.

The base 310 of the nozzle part 300 may form a main body of the nozzle part 300. The base 310 may be attached to the inkjet head part 100.

The internal flow path 330 of the nozzle part 300 may be located inside the base 310 and may be connected (or extended) to an internal tube (not shown) of the inkjet head part 100.

The internal flow path 330 may be a tube passing through the base 310 and may provide a channel through which the remaining part of the ink 90 (e.g., the remaining part of the ink 90 not introduced into the injection holes 350 of the nozzle part 300 after the ink has been supplied to the nozzle part 300 via the first connecting line IL1 connected (or extended) to the ink storage part 500) may be retrieved to the ink storage part 500 via the second connecting line IL2 connected (or extended) to the ink storage part 500.

In some embodiments, the internal flow path 330 may have a shape that generally extends in the first direction DR1, but the disclosure is not limited thereto. In the example shown in FIG. 5, the internal flow path 330 may have a shape generally extended in the first direction DR1.

The injection holes 350 of the nozzle parts 300 may receive the ink 90 passing through the internal flow path 330 from the internal flow path 330 and discharge the ink 90. As shown in FIGS. 5 and 6, the injection holes 350 may be arranged on an opposite side of the internal flow path 330 in the third direction DR3, and the injection holes 350 may be spaced apart from one another in the first direction DR1. For example, each of the injection holes 350 may be connected (or extended) to the internal flow path 330, and the injection holes 350 may be arranged and spaced apart from one another along the extension direction (i.e., the first direction DR1). Each of the injection holes 350 may be connected (or extended) to the internal flow path 330. Each of the injection holes 350 may include an inlet 351, a pressure part 353, and an outlet 355.

The inlet 351 of each of the injection holes 350 may define an entrance area ENA in which the ink 90 is supplied from the internal flow path 330. The entrance area ENA may be connected (or extended) to the opposite side of the internal flow path 330 in the third direction DR3. The entrance area ENA may be a space passing through the inlet 351. For example, the inlet 351 may have a shape surrounding the entrance area ENA, and the entrance area ENA may be defined as a space surrounded by the inlet 351.

The entrance of the inlet 351 may be formed at an acute angle. For example, the inlet 351 may include a flat surface 351*a* as a surface arranged in the third direction DR3, and an inclined surface 351*b* as a surface surrounding the entrance area ENA. The flat surface 351*a* may intersect the inclined surface 351*b* at a first angle θ1 that is an acute angle.

The flat surface 351*a* of the inlet 351 may be in direct contact with the internal flow path 330 and may be parallel to an extension direction of the internal flow path 330 (e.g., the first direction DR1). The flat surface 351*a* may have a flat surface in the extending direction of the internal flow path 330. For example, as shown in FIG. 6, the flat surface 351*a* may be flat without protruding toward the internal flow path 330 or being depressed (or recessed) in the third direction DR3. For example, an opposite edge of the internal flow path 300 in the third direction DR3 may be defined by the base 310 and the flat surface 351*a* of the inlet 351. Accordingly, the bipolar elements 95 dispersed in the ink 90 passing through the internal flow path 330 can flow without being accumulated.

The inclined surface 351*b* of the inlet 351 may be the surface surrounding the entrance area ENA and may have a shape inclined at a first angle θ1 with respect to the flat surface 351*a*. For example, the inclined surface 351*b* may intersect the flat surface 351*a* at the first angle θ1. The first angle θ1 may be an acute angle of less than 90°. As the inclined surface 351*b* is inclined at the first angle θ1 that is an acute angle with respect to the flat surface 351*a*, the inclined surface 351*b* may not be exposed from the entrance area ENA in case that the entrance area ENA is viewed from the third direction DR3 as shown in FIG. 6. For example, an area of an end of the entrance area ENA in the third direction DR3 may be smaller than an area of an opposite end of the entrance area ENA in the third direction DR3. Accordingly, in case that the bipolar elements 95 are introduced into the entrance area ENA, the bipolar elements 95 may not be accumulated on the inlet 351. Thus, the lifetime of the nozzle parts 300 may be improved.

For example, referring to FIGS. 8 and 9, an inkjet printing apparatus 1' according to Comparative Example is different from the inkjet printing apparatus 1 according to the above-described embodiment at least in that an entrance of an inlet of each of injection holes 350' is formed as an obtuse angle.

As the inlet of the injection hole 350' of the inkjet printing apparatus 1' according to Comparative Example is formed at an obtuse angle, an area of an end of an entrance area ENA' in the second direction DR2 may be larger than an area of an opposite end in the third direction DR3. Thus, an inclined surface of the inlet may be exposed as shown in FIG. 9, unlike that of FIG. 6. As a result, bipolar elements 95 may be introduced into the entrance area ENA' and may form a precipitate (e.g., region B) which may block the entrance area ENA'. Therefore, the lifetime of nozzle parts 300' may be reduced.

In view of the above, by inclining the inclined surface 351*b* at the first angle θ1 that is an acute angle with respect to the flat surface 351*a*, it is possible to prevent the lifetime of the nozzle parts 300 from being reduced.

Referring back to FIGS. 5 to 7, since the inclined surface 351*b* is inclined at the first angle θ1 that is an acute angle with respect to the flat surface 351*a*, a width W1 of the entrance area ENA may gradually increase toward the opposite side in the third direction DR3. If the first angle θ1 is 90°, an entrance area ENA may not be able to have sufficient volume compared to the entrance area ENA having the first angle θ1 of an acute angle. As a result, an inflow resistance of the entrance area ENA may become larger, and the ink 90 may not be readily introduced. In view of the above, by setting the first angle θ1 as an acute angle to ensure a sufficient volume of the entrance area ENA, it is possible to reduce the inflow resistance of the ink 90 into the inlet 351.

The pressure part 353 of each of the injection holes 350 may define a pressure area PRA that applies pressure to the ink 90 introduced from the entrance area ENA. The pressure area PRA may be a space passing through the pressure part 353. For example, the pressure part 353 may have a shape surrounding the pressure area PRA, and the pressure area PRA may be defined as the space surrounded by the pressure area 353. The pressure part 353 may apply pressure to the ink 90 introduced from the inlet 351 and adjust the amount of ink 90 discharged.

The pressure part 353 may be disposed under the inlet 351. Accordingly, the pressure area PRA may be disposed under the entrance area ENA. In some embodiments, the pressure part 353 may include a piezoelectric element. However, the disclosure is not limited thereto. In case that the pressure part 353 includes a piezoelectric element, a shape of the pressure part 353 may be deformed by an electrical signal applied to the pressure part 353 to apply pressure to the ink 90. In case that the pressure part 353 includes a piezoelectric element, the pressure part 353 may include, for example, a ceramic material such as barium titanate ($BaTiO_3$) and ammonium dihydrogen phosphate ($NH_4H_2PO_4$) However, the disclosure is not limited thereto.

The outlet 355 of each of the injection holes 350 may define an exit area EXA from which the ink 90 is discharged by the pressure applied in the pressure area PRA. The exit area EXA may be a space passing through the outlet 355. For example, the outlet 355 may have a shape surrounding the exit area EXA, and the exit area EXA may be defined as the space surrounded by the outlet 355.

The outlet 355 may include a material whose shape is not deformed by an external force. The outlet 355 may include a material different from a material of the pressure part 353. For example, in case that the pressure part 353 includes a piezoelectric element, the outlet 355 may include a material other than the piezoelectric element.

As described above, the ink 90 introduced into each of the injection holes 350 through the internal flow path 330 of the nozzle part 300 may sequentially pass through the entrance area ENA, the pressure area PRA, and the exit area EXA along the opposite side in the third direction DR3, and the bipolar elements 95 of the ink 90 may not be precipitated by virtue of the shape of the inlet 351. Accordingly, the lifetime of the nozzle part 300 may be improved, and the inflow resistance of the ink 90 may be reduced. Thus, the ink 90 may readily move to the pressure area PRA.

Hereinafter, detailed description of a probe device of the inkjet printing apparatus 1 according to the embodiment is provided below.

Figure 10:
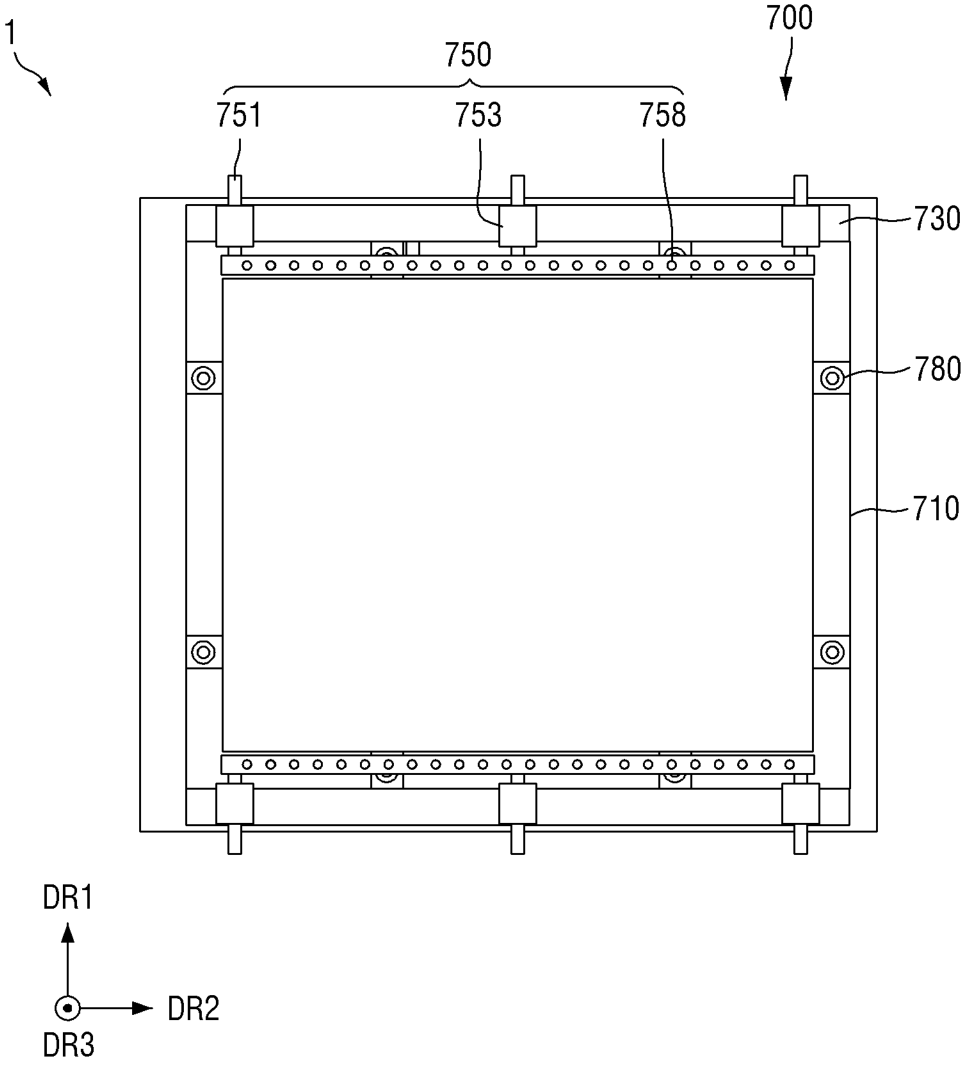
FIG. 10 is a schematic plan view of the probe device of the inkjet printing apparatus according to the embodiment of FIG. 1 as viewed from the third direction.
Figure 11:
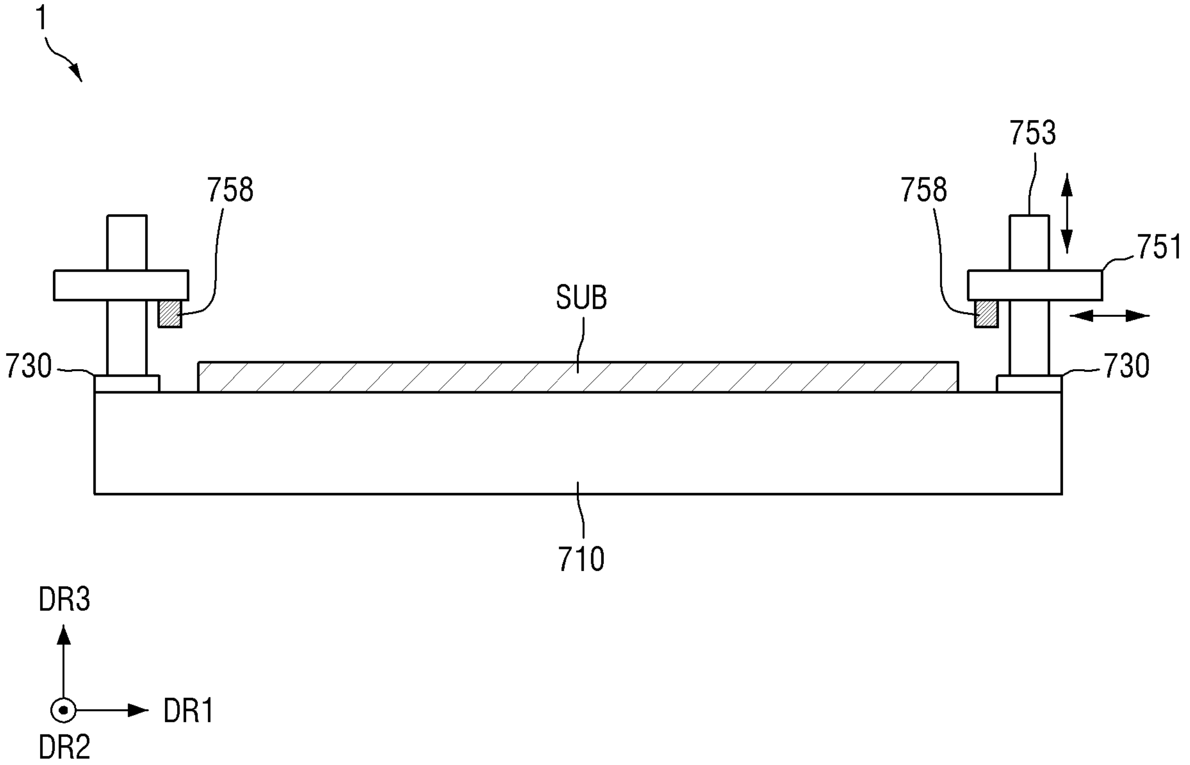
FIGS. 11 and 12 are diagrams schematically illustrating operations of the probe device of FIG. 10.
Figure 12:
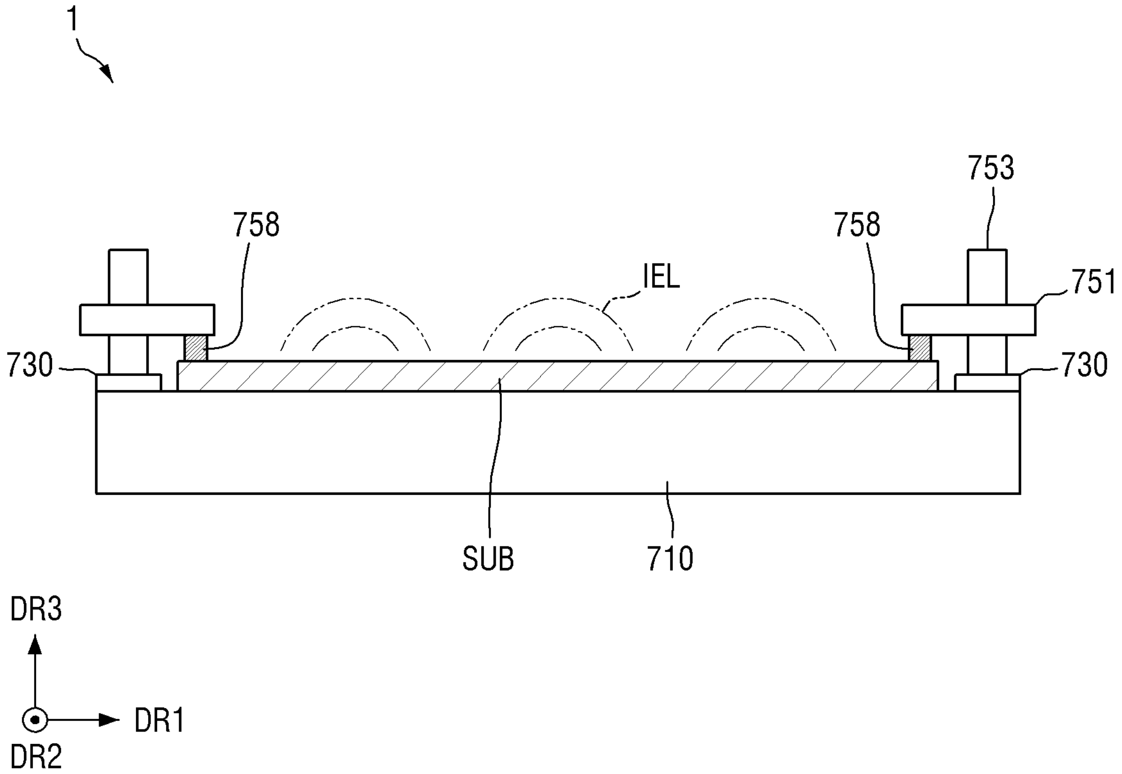
Figure 13:
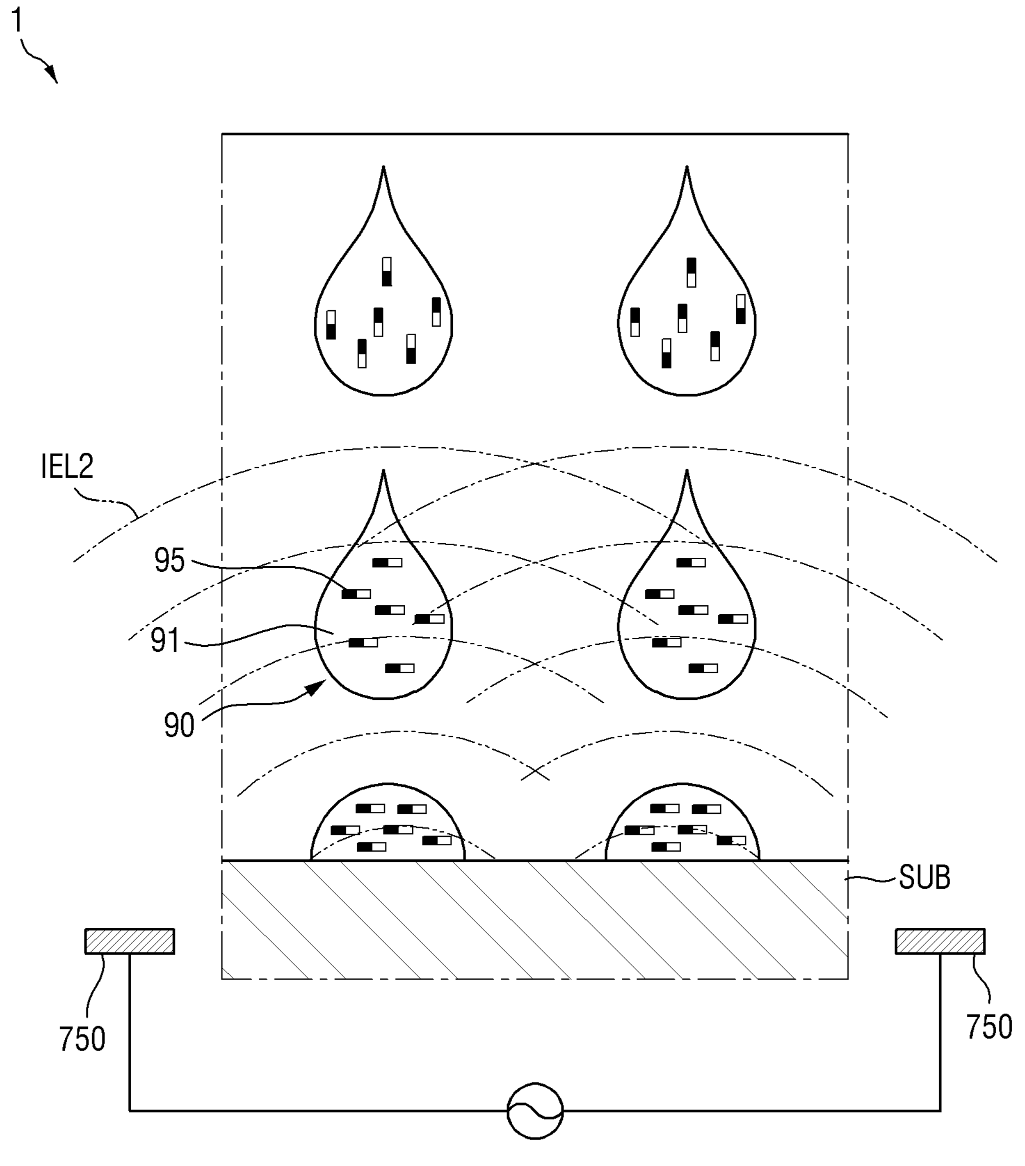
FIG. 13 is a view schematically showing that an electric field is generated over a target substrate by the probe device of FIG. 10 to align the solid substances in the ink.

FIG. 10 is a schematic plan view of the probe device of the inkjet printing apparatus according to the embodiment of FIG. 1 as viewed from the third direction. FIGS. 11 and 12 are views schematically illustrating operations of the probe device of FIG. 10. FIG. 13 is a view schematically showing generation of an electric field over a target substrate by the probe device of FIG. 10 to align the solid substances in the ink.

Referring to FIGS. 10 to 13, the probe device 700 may include a sub-stage 710, a probe support 730, a probe part 750, and an aligner 780.

The probe device 700 may be disposed on the stage STA and may move in the second direction DR2 together with the stage STA. The probe device 700 having the target substrate SUB disposed thereon may move along the stage STA, and the ink 90 may be sprayed on the target substrate SUB. In case that the ink 90 is sprayed, the probe device 700 may generate an electric field IEL over the target substrate SUB.

The sub-stage 710 may provide a space in which the target substrate SUB is placed. The probe support 730, the probe part 750, and the aligner 780 may be disposed on the sub-stage 710.

At least one aligner 780 may be disposed on the sub-stage 710. The aligner 780 may be disposed on each of sides of the sub-stage 710, and the target substrate SUB may be placed in an area surrounded by aligners 780.

The probe support 730 and the probe part 750 may be disposed on the sub-stage 710. The probe support 730 may provide a space in which the probe part 750 is disposed on the sub-stage 710. For example, the probe support 730 may be disposed on at least one side on the sub-stage 710 and may be extended in the extending direction of the side on the sub-stage 710. For example, as shown in the drawing, the probe support 730 may be extended in the second direction DR2 on left and right sides of the sub-stage 710.

The probe part 750 may be disposed on the probe support 730 and form an electric field IEL on the target substrate SUB prepared on the sub-stage 710. The probe part 750 and the probe support 730 may be extended in the second direction DR2. The length of the probe part 750 may be greater than a length of the target substrate SUB.

The probe part 750 may include a probe driver 753, a probe jig 751, and a probe pad 758. The probe driver 753 may be disposed on the probe support 730. The probe jig 751 may be disposed on the probe driver 753 and transmit an electrical signal. The probe pad 758 may be connected (or extended) to the probe jig 751 and transmit the electrical signal to the target substrate SUB.

The probe driver 753 may be disposed on the probe support 730 and move the probe jig 751 and the probe pad 758 in the third direction DR3. The probe pad 753 may be connected to or separated from the target substrate SUB by the driving of the probe driver 758.

As shown in FIG. 12, the probe pad 758 may be connected to the target substrate SUB and form an electric field IEL over the target substrate SUB through an electrical signal transmitted from the probe jig 751. For example, the probe pad 758 may be in contact with an electrode or a power pad of the target substrate SUB, and the electrical signal from the probe jig 751 may be transmitted to the electrode or the power pad of the target substrate SUB.

The probe jig 751 may be connected (or extended) to the probe pad 758 and may be connected (or extended) to a separate voltage application device. The probe jig 751 may transmit an electrical signal transmitted from the voltage application device to the probe pad 758 to form an electric field IEL on the target substrate SUB. The electrical signal transmitted to the probe jig 751 may be a voltage for forming the electric field IEL, for example, an AC voltage. In other embodiments, multiple probe jigs 751 may be disposed, and the number of the probe jigs 751 is not particularly limited herein.

In the ink 90 discharged from the nozzle parts 300 onto the target substrate SUB, the bipolar elements 95 each including the first end and the second end having the above-described polarities may be dispersed. In case that the bipolar elements 95 are placed in an electric field IEL, a dielectrophoretic force may be transmitted so that their positions or orientations may be changed. As shown in FIG. 12, the bipolar elements 95 in the ink 90 sprayed onto the target substrate SUB may be seated on the target substrate SUB while their positions and orientations are changed by the electric field IEL generated by the probe device 700.

The timing at which the probe device 700 generates the electric field IEL over the target substrate SUB may not be particularly limited herein. In the drawings, the probe part 750 may generate the electric field IEL while the ink 90 is discharged from the nozzle units 300 and reaches the target substrate SUB. Accordingly, after the bipolar elements 95 have been discharged from the nozzles, the bipolar elements 95 may receive the dielectrophoretic force by the electric field IEL until the bipolar elements 95 reach the target substrate SUB. In some embodiments, the probe part 750 may generate the electric field IEL after the ink 90 has been seated on the target substrate SUB.

Although not shown in the drawings, the inkjet printing apparatus 1 according to an embodiment of the disclosure may further include a heat treatment part in which a process of volatilizing the ink 90 sprayed onto the target substrate SUB is performed. The heat treatment part may irradiate heat to the ink 90 sprayed onto the target substrate SUB, so that the solvent 91 of the ink 90 may be volatilized and removed, whereas the bipolar elements 95 may be disposed (or remain) on the target substrate SUB. The process of removing the solvent 91 by the irradiation of the heat to the ink 90 may be performed by a heat treatment process. Detailed description of the same constituent elements is omitted.

Incidentally, the above-described bipolar elements 95 may be light-emitting elements 30 including semiconductor layers, and the inkjet printing apparatus 1 according to the embodiment of the disclosure may fabricate the display device 10 including the light-emitting elements 30. Hereinafter, detailed description of the display device 10 including the light-emitting elements 30 is provided below.

Figure 14:
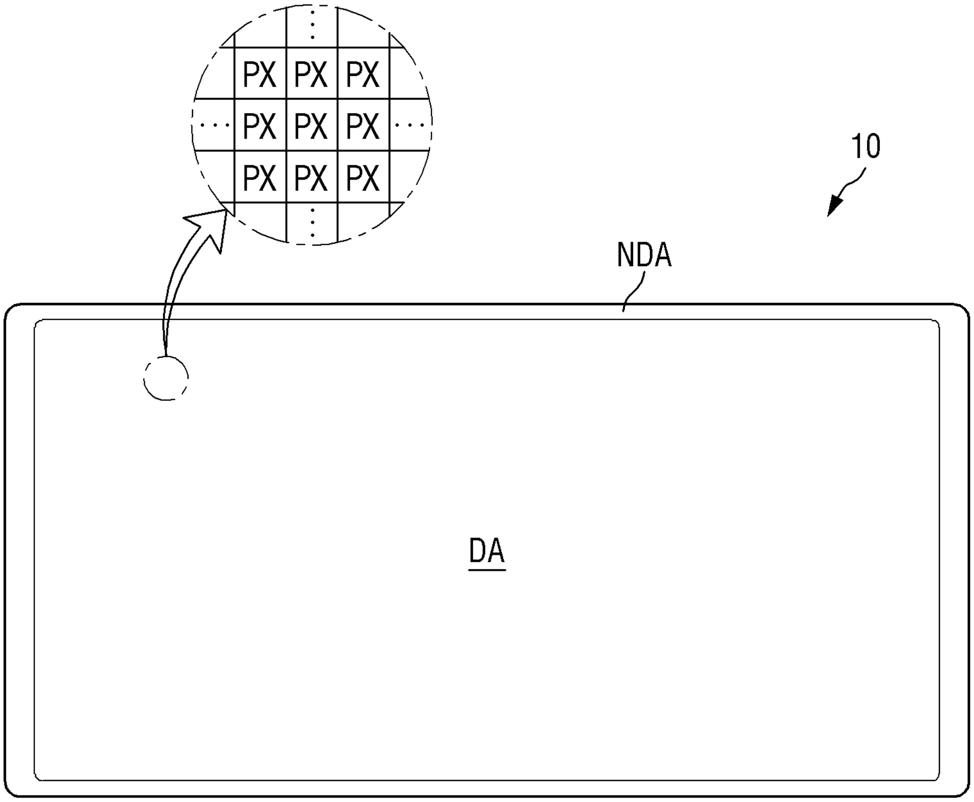
FIG. 14 is a plan view schematically showing a display device according to an embodiment of the disclosure.
Figure 15:
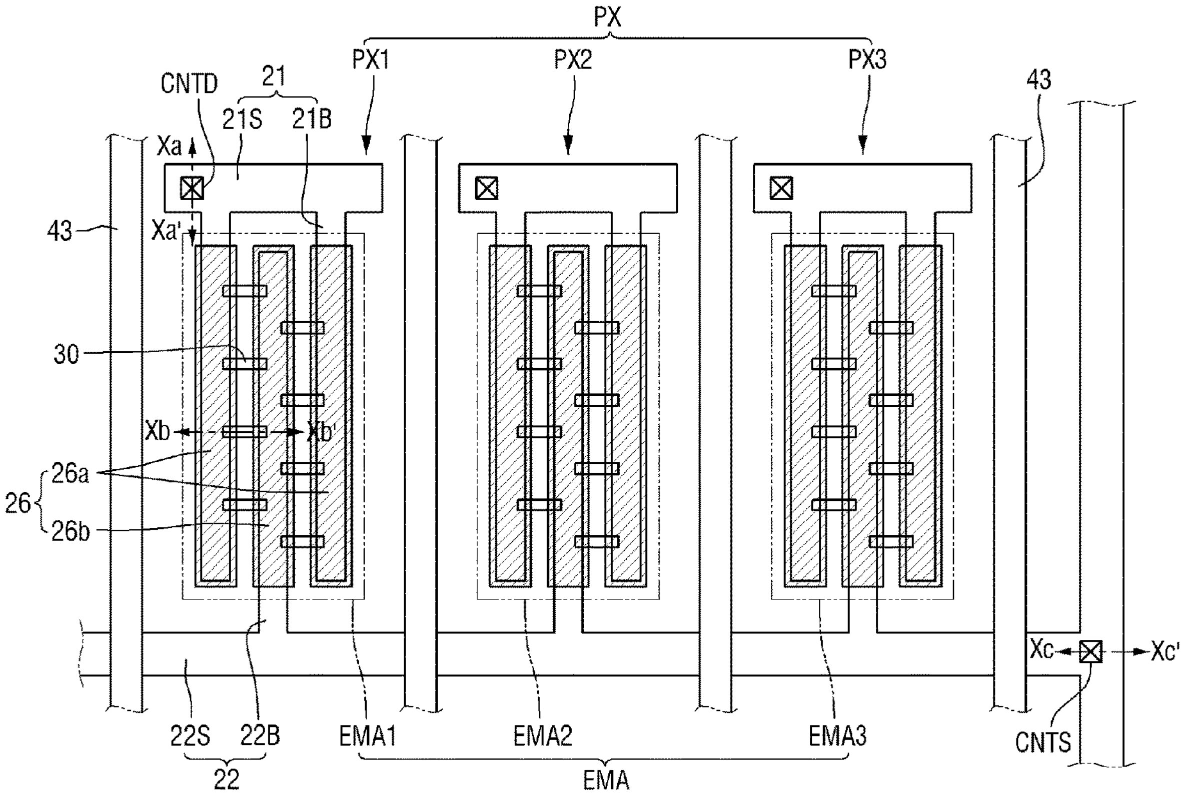
FIG. 15 is a view schematically showing the layout of the structure of a pixel of the display device according to the embodiment of FIG. 14.
Figure 16:
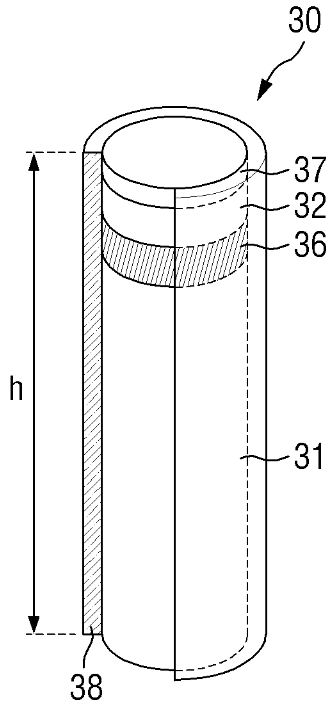
FIG. 16 is a view schematically showing a light-emitting element of the display device according to the embodiment of FIG. 14.
Figure 17:
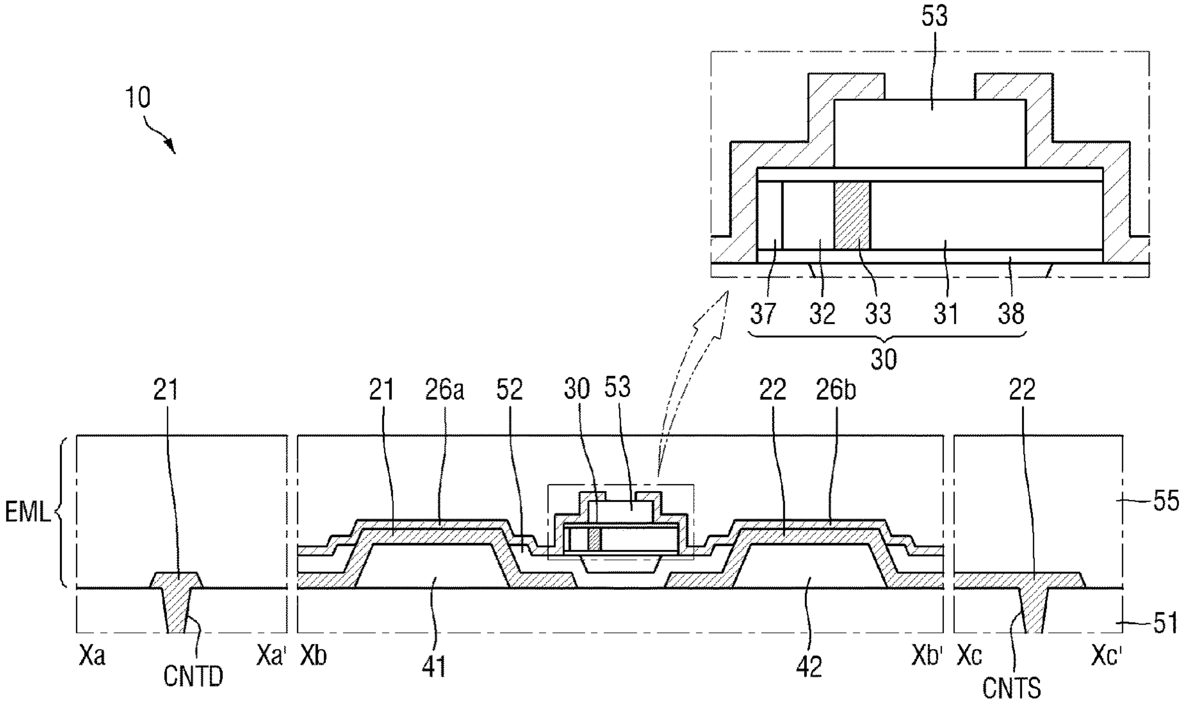
FIG. 17 is a schematic cross-sectional view taken along lines Xa-Xa', Xb-Xb', and Xc-Xc' of FIG. 15.
Figure 18:
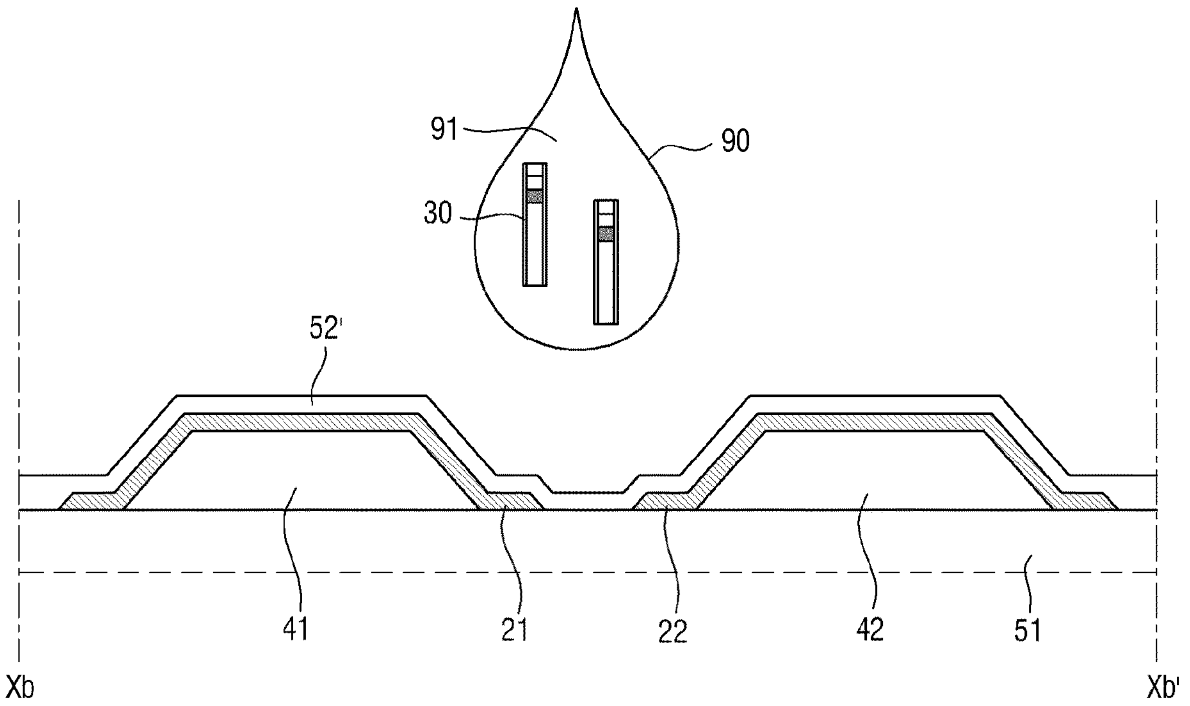
FIGS. 18 to 20 are schematic views illustrating a method of fabricating the display device according to the embodiment of FIG. 14.
Figure 19:
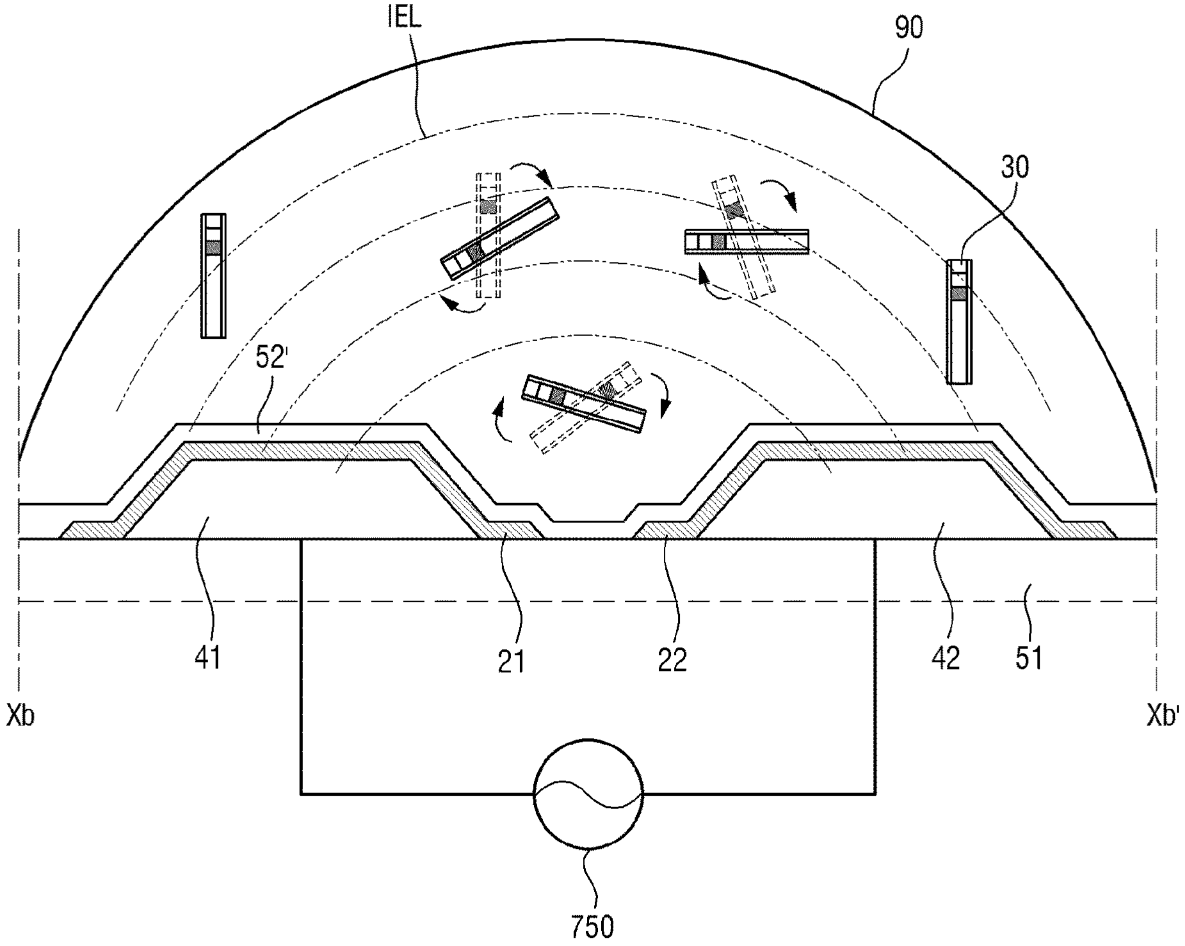
Figure 20:
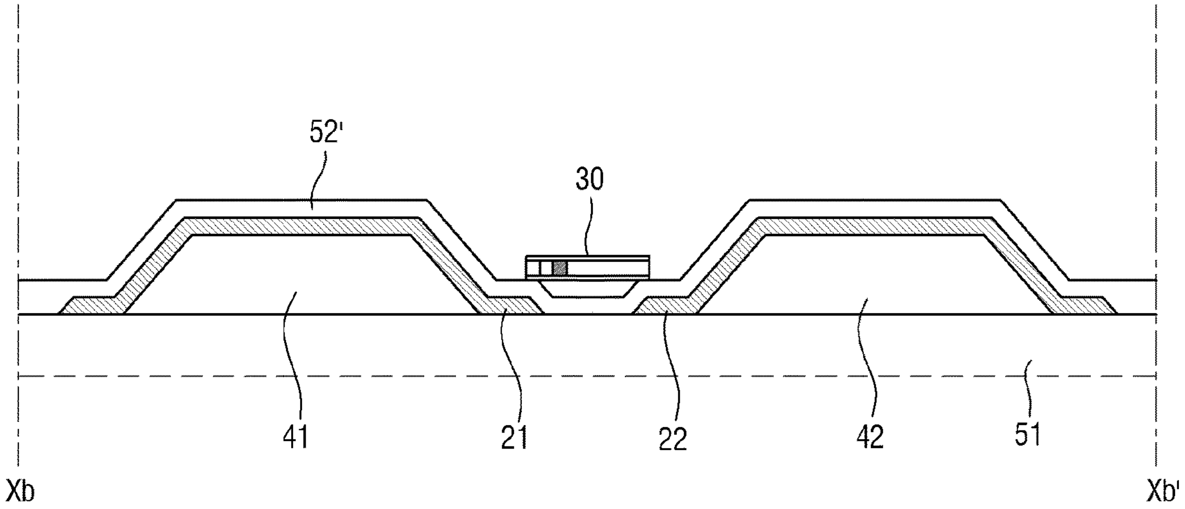

FIG. 14 is a plan view schematically showing a display device according to an embodiment of the disclosure. FIG. 15 is a view schematically showing the layout of the structure of a pixel of the display device according to the embodiment of FIG. 14. FIG. 16 is a view schematically showing a light-emitting element of the display device according to the embodiment of FIG. 14. FIG. 17 is a schematic cross-sectional view taken along lines Xa-Xa', Xb-Xb', and Xc-Xc' of FIG. 15. FIGS. 18 to 20 are schematic views illustrating a method of fabricating the display device according to the embodiment of FIG. 14.

Referring to FIG. 14, the display device 10 according to the embodiment may display a moving image or a still image. The display device 10 may refer to any electronic device that provides a display screen. For example, the display device 10 may include a television set, a laptop computer, a monitor, an electronic billboard, the Internet of Things devices, a mobile phone, a smart phone, a tablet personal computer (PC), an electronic watch, a smart watch, a watch phone, a head-mounted display device, a mobile communications terminal, an electronic notebook, an electronic book, a portable multimedia player (PMP), a navigation device, a game console, a digital camera, a camcorder, etc.

A shape of the display device 10 may be modified in various ways. For example, the display device 10 may have shapes such as a rectangle with longer lateral sides, a rectangle with longer vertical sides, a square, a quadrangle with rounded corners, other polygons, a circle, etc. The shape of a display area DA of the display device 10 may be similar to an overall shape of the display device 10. FIG. 13 shows the display device 10 and the display area DA in a shape of a rectangle with longer horizontal sides.

The display device 10 may include the display area DA and a non-display area NDA. In the display area DA, images may be displayed. In the non-display area NDA, images may not be displayed. The display area DA may be referred to as an active area, while the non-display area NDA may also be referred to as an inactive area.

The display area DA may generally occupy a center of the display device 10. The display area DA may include pixels PX. The pixels PX may be arranged in a matrix. Each of the pixels PX may have a rectangle shape or a square shape in a plan view. However, the disclosure is not limited thereto. Each of the pixels PX may have a diamond shape having sides inclined in a direction. Each of the pixels PX may include at least one light-emitting element 30 that emits light of a wavelength band (e.g., a particular or selectable wave length band) to represent a color.

Referring to FIG. 15, each of the pixels PX may include a first sub-pixel PX1, a second sub-pixel PX2, and a third sub-pixel PX3. The first sub-pixel PX1 may emit light of a first color, the second sub-pixel PX2 may emit light of a second color, and the third sub-pixel PX3 may emit light of a third color. The first color may be blue, the second color may be green, and the third color may be red, but the disclosure is not limited thereto. The sub-pixels PXn may emit light of a same color. Although the pixel PX includes three sub-pixels PXn in the example shown in FIG. 15, the disclosure is not limited thereto. The pixel PX may include more than two sub-pixels PXn.

Each of the sub-pixels PXn of the display device 10 may include an area defined as an emission area EMA. The first sub-pixel PX1 may include a first emission area EMA1, the second sub-pixel PX2 may include a second emission area EMA2, and the third sub-pixel PX3 may include a third emission area EMA3. The emission area EMA may be defined as an area in which the light-emitting element 30 included in the display device 10 is disposed and emits light of a wavelength band (e.g., a specific or selectable wavelength band).

Although not shown in the drawings, each of the sub-pixels PXn of the display device 10 may include a non-emission area defined as another area than the emission area EMA. In the non-emission area, the light-emitting elements 30 may not be disposed and the lights emitted from the light-emitting elements 30 may not reach, and thus no light may exit from the non-emission area.

Each of the sub-pixels PXn of the display device 10 may include electrodes 21 and 22, light-emitting elements 30, contact electrodes 26, inner banks 41 and 42 (e.g., refer to FIG. 17), an outer bank 43, and at least one insulating layer 51, 52, 53 and 55 (e.g., refer to FIG. 17).

The electrodes 21 and 22 may be electrically connected to the light-emitting elements 30, and a voltage (e.g., a predetermined or selectable voltage) may be applied to the electrodes 21 and 22. Thus, the light-emitting element 30 may emit light of a specific wavelength band. At least a part of the electrodes 21 and 22 may be utilized to form an electric field within the sub-pixels PXn, and the light-emitting element 30 may be aligned.

The electrodes 21 and 22 may include the first electrode 21 and the second electrode 22. In an embodiment, the first electrode 21 may be disconnected from a sub-pixel PXn to another sub-pixel PXn, while the second electrode 22 may be a common electrode connected across the sub-pixels PXn. One of the first electrode 21 and the second electrode 22 may be an anode electrode of the light-emitting element 30, and another of the first electrode 21 and the second electrode 22 may be a cathode electrode of the light-emitting element 30. However, the disclosure is not limited thereto.

The first electrode 21 and the second electrode 22 may include electrode stems 21S and 22S extended in the horizontal direction, respectively, and one or more electrode branches 21B and 22B branching off from the electrode stems 21S and 22S, respectively, and extended in the vertical direction intersecting the horizontal direction.

The first electrode 21 may include a first electrode stem 21S and at least one first electrode branch 21B. The first electrode stem 21S may be extended in the horizontal direction. The at least one first electrode branch 21B may branch off from the first electrode stem 21S and be extended in the vertical direction.

In a pixel, ends (e.g., both ends) of the first electrode stem 21S of the sub-pixel PXn may be terminated between the sub-pixels PXn. The ends (e.g., both ends) of the first electrode stem 21S may be spaced apart from the adjacent sub-pixels PXn and located on substantially the same straight line as the first electrode stem 21S of the adjacent pixel in the same row e.g., in the horizontal direction. Since the ends of the first electrode stem 21S disposed in each of the sub-pixels PXn are spaced apart from those of the other sub-pixels PXn, different electric signals may be applied to the different first electrode branches 21B, so that the first electrode branches 21B can be driven individually.

The first electrode branches 21B may branch off from at least a part of the first electrode stem 21S and be extended in the vertical direction. The first electrode branches 21B may be terminated such that they are spaced apart from the second electrode stem 22S that is opposed to the first electrode stem 21S.

The second electrode 22 may include a second electrode stem 22S and a second electrode branch 22B. The second electrode stem 22S may be extended in the horizontal direction and spaced apart from the first electrode stem 21S in the vertical direction, and a second electrode branch 22B branching off from the second electrode stem 22S and extended in the vertical direction. The opposite end of the second electrode stem 22S may be electrically connected to the second electrode stem 22S of another sub-pixel PXn adjacent to the pixel in the horizontal direction. For example, the second electrode stem 22S may be extended in the horizontal direction to cross different sub-pixels PXn, unlike the first electrode stem 21S. The second electrode stem 22S may be extended across the sub-pixels PXn and electrically connected to a portion extending in a direction at an outer portion of the display area DA in which the pixels PX or the sub-pixels PXn are disposed, or in the non-display area NDA.

The second electrode branch 22B may be spaced apart from and face the first electrode branch 21B (e.g., face a side of the first electrode branch 21B). The second electrode branch 22B may be terminated while being spaced apart from the first electrode stem 21S. The second electrode branch 22B may be electrically connected to the second electrode stem 22S, and an end of the second electrode branch 22B may be spaced apart from the first electrode stem 21S in the sub-pixel PXn.

The first electrode 21 and the second electrode 22 may be electrically connected to a circuit element layer of the display device 10 through contact holes. For example, the first electrode 21 and the second electrode 22 may be electrically connected to the circuit element layer of the display device 10 through a first electrode contact hole CNTD and a second electrode contact hole CNTS, respectively. In the drawing, the first electrode contact hole CNTD may be formed in every first electrode stem 21S of each of the sub-pixels PXn, and the second electrode contact hole CNTS may be formed only in the single second electrode stem 22S that crosses the sub-pixels PXn. However, the disclosure is not limited thereto. In some implementations, the second contact hole CT2 may be formed in each of the sub-pixels PXn.

The outer bank 43 may be disposed at the boundary between the sub-pixels PXn, and the inner banks 41 and 42 may be disposed adjacent to the center of each of the sub-pixels PXn and under the electrodes 21 and 22. Although the inner banks 41 and 42 (e.g., refer to FIG. 17) are not shown in FIG. 15, the first inner bank 41 and the second inner bank 42 may be disposed under the first electrode branch 21B and the second electrode branch 22B, respectively.

The outer bank 43 may be disposed at the boundary between the sub-pixels PXn (e.g., adjacent ones of the sub-pixels PXn). The ends of the first electrode stems 21S may be terminated at the external bank 43, and the ends of the first electrode stems 21S may be spaced apart from one another. For example, the ends of the first electrode stems 21S may be spaced apart from the external bank 43. The outer bank 43 may be extended in the vertical direction and may be disposed at the boundaries of the sub-pixels PXn arranged in the horizontal direction. However, the disclosure is not limited thereto. The outer bank 43 may be extended in the horizontal direction and may be disposed at the boundaries of the sub-pixels PXn arranged in the vertical direction as well. The outer bank 43 and the inner banks 41 and 42 may include a same material, and may be formed together via a single process.

The light-emitting element 30 may be disposed between the first electrode 21 and the second electrode 22. An end of the light-emitting element 30 may be electrically connected to the first electrode 21, and another end thereof may be electrically connected to the second electrode 22. The light-emitting elements 30 may be electrically connected to the first electrode 21 and the second electrode 22 through contact electrodes 26. Detailed description of the contact electrodes 26 is provided below.

The light-emitting elements 30 may be spaced apart from one another and may be substantially parallel to one another. A spacing (or a distance) between the light-emitting elements 30 is not limited thereto. In some implementations, some of the light-emitting elements 30 may be disposed close to each other to form a group, and some other of the light-emitting elements 30 may disposed close to each other to form another group that is spaced apart from the group. In other embodiments, the light-emitting elements 30 may be arranged such that they are orientated in a direction with irregular densities. In the embodiment, the light-emitting elements 30 may have a shape extended in a direction. The direction in which the electrodes (e.g., the first electrode branch 21B and the second electrode branch 22B) are extended may be substantially perpendicular to the direction in which the light-emitting elements 30 are extended. However, the disclosure is not limited thereto. The light-emitting elements 30 may be oriented obliquely to the direction in which the first electrode branch 21B and the second electrode branch 22B are extended, rather than being perpendicular to it.

The light-emitting element 30 may be a light-emitting diode. For example, the light-emitting element 30 may have a size in micrometers or nanometers and may be an inorganic light-emitting diode made of an inorganic material. The electric field IEL (e.g., refer to FIG. 12) may be formed in the direction between the two electrodes (e.g., the first electrode 21 and the second electrode 22), and polarities may be created therebetween. Thus, inorganic light-emitting diodes may be aligned between the two electrodes facing each other. The light-emitting elements 30 may be aligned between two electrodes by an electric field formed over the two electrodes.

The light-emitting element 30 according to an embodiment may have a shape extended in a direction. The light-emitting element 30 may have a shape of a rod, wire, tube, etc. In an embodiment, the light-emitting element 30 may have a cylindrical or rod-like shape. The shape of the light-emitting element 30 is not limited thereto. The light-emitting element 30 may have various shapes including a polygonal column shape such as a cube, a cuboid, a hexagonal column, etc. In other embodiments, the light-emitting element 30 may have a shape that is extended in a direction with partially inclined outer surfaces. The semiconductors included in the light-emitting element 30 may have a structure sequentially arranged or stacked each other along the direction. Detailed description of the semiconductors included in the light-emitting element 30 is provided below.

The light-emitting element 30 may include a semiconductor layer doped with impurities of a conductive type (e.g., p-type or n-type). An electric signal applied from an external source may be transmitted, and the semiconductor layers may emit light of a wavelength band (e.g., a certain or selectable wavelength band).

In some embodiments, the light-emitting element 30 according to an embodiment may have a shape extended in a direction. The light-emitting element 30 may have a shape such as nanorods, nanowires and nanotubes. In an embodiment, the light-emitting element 30 may have a cylindrical or rod-like shape. However, the shape of the light-emitting element 30 is not limited thereto and may have various shapes such as a cube, a cuboid and a hexagonal column.

As shown in FIG. 16, the light-emitting element 30 may include a first semiconductor layer 31, a second semiconductor layer 32, an active layer 36, an electrode layer 37, and an insulating film 38.

The first semiconductor layer 31 may be an n-type semiconductor. For example, when the light-emitting element 30 emits light of a blue wavelength band, the first semiconductor layer 31 may include a semiconductor material having the following chemical formula: $Al_xGa_yIn_{1-x-y}N$ ($0 \le x \le 1$, $0 \le y \le 1$, $0 \le x+y \le 1$). For example, the semiconductor material of the first semiconductor layer 31 may be at least one of n-type doped AlGaInN, GaN, AlGaN, InGaN, AlN, and InN. The first semiconductor layer 31 may be doped with an n-type dopant, and the n-type dopant may be Si, Ge, Sn, etc. However, the disclosure is not limited thereto. According to an embodiment of the disclosure, the first semiconductor layer 31 may be n-GaN doped with n-type Si. A length of the first semiconductor layer 31 may be in a range of about 1.5 μm to about 5 μm. However, the disclosure is not limited thereto.

The second semiconductor layer 32 may be disposed on the active layer 36. Detailed description of the active layer 36 is provided below. The second semiconductor layer 32 may be a p-type semiconductor. For example, when the light-emitting element 30 emits light of a blue or green wavelength band, the second semiconductor layer 32 may include a semiconductor material having the following chemical formula: $Al_xGa_yIn_{1-x-y}N$ ($0 \le x \le 1$, $0 \le y \le 1$, $0 \le x+y \le 1$). For example, the semiconductor material of the second semiconductor layer 32 may be at least one of p-type doped AlGaInN, GaN, AlGaN, InGaN, AlN, and InN. The second semiconductor layer 32 may be doped with a p-type dopant, and the p-type dopant may be at least one of Mg, Zn, Ca, Se, and Ba. However, the disclosure is not limited thereto. According to an embodiment of the disclosure, the second semiconductor layer 32 may be p-GaN doped with p-type Mg. A length of the second semiconductor layer 32 may be in a range of about 0.05 μm to about 0.10 μm. However, the disclosure is not limited thereto.

Although each of the first semiconductor layer 31 and the second semiconductor layer 32 is implemented as a signal layer in the drawings, the disclosure is not limited thereto. According to some embodiments of the disclosure, depending on the material of the active layer 36, the first semiconductor layer 31 and the second semiconductor layer 32 may further include a larger number of layers (e.g., a clad layer, a tensile strain barrier reducing (TSBR) layer, or the like).

The active layer 36 may be disposed between the first semiconductor layer 31 and the second semiconductor layer 32. The active layer 36 may include a material having a single or multiple quantum well structure. When the active layer 36 includes a material having the multiple quantum well structure, the structure of the active layer 36 may include quantum layers and well layers alternately stacked one another. Electron-hole pairs may be combined in the active layer 36 in response to an electrical signal applied through the first semiconductor layer 31 and the second semiconductor layer 32, and the active layer 36 may emit light. For example, when the active layer 36 emits light of the blue wavelength band, the active layer 36 may include a material such as AlGaN and AlGaInN. For example, when the active layer 36 has a multi-quantum well structure in which quantum layers and well layers are alternately stacked one another, the quantum layers may include AlGaN or AlGaInN, and the well layers may include a material such as GaN and AlGaN. According to an embodiment of the disclosure, the active layer 36 may include AlGaInN as the quantum layer and AlInN as the well layer, and the active layer 36 may emit blue light having a center wavelength band in a range of about 450 nm to about 495 nm.

However, the disclosure is not limited thereto. The active layer 36 may have a structure in which a semiconductor material having a large band gap energy and a semiconductor material having a small band gap energy are alternately stacked on one another, and may include other Group III to Group V semiconductor materials depending on the wavelength range of the emitted light. Accordingly, the light emitted from the active layer 36 is not limited to the light of the blue wavelength band. The emissive layer 36 may emit light of red or green wavelength band in some implementations. A length of the active layer 36 may be in a range of about 0.05 μm to about 0.10 μm. However, the disclosure is not limited thereto.

The light emitted from the active layer 36 may exit not only through outer surfaces of the light-emitting element 30 in a longitudinal direction but also through side surfaces (e.g., both side surfaces) of the light-emitting element 30. The direction in which the light emitted from the active layer 36 propagates is not limited to one direction, and the light may be emitted from the active layer 36 in various directions.

The electrode layer 37 may be an ohmic contact electrode. However, the disclosure is not limited thereto. The electrode layer 37 may be Schottky contact electrodes. The light-emitting element 30 may include at least one electrode layer 37. Although the light-emitting element 30 includes the electrode layer 37 in the example shown in FIG. 28, the disclosure is not limited thereto. In some implementations, the light-emitting element 30 may include a larger number of electrode layers 37. In other embodiments, the electrode layer 37 may be omitted. The following description on the light-emitting element 30 may be equally applied even if the number of electrode layers 37 is different or the electrode layer 37 may further include other structures.

The electrode layer 37 may reduce a resistance (e.g., electrical resistance) between the light-emitting element 30 and the electrodes or the contact electrodes when the light-emitting element 30 is electrically connected to the electrodes (e.g., the first electrode 21 and the second electrode 22 of FIG. 15) or the contact electrodes 26 (e.g., refer to FIG. 15) in the display device 10 according to the embodiment of the disclosure. The electrode layer 37 may include a metal having electrical conductivity. For example, the electrode layer 37 may include at least one of aluminum (Al), titanium (Ti), indium (In), gold (Au), silver (Ag), indium tin oxide (ITO), indium zinc oxide (IZO), and indium tin-zinc oxide (ITZO). The electrode layer 37 may include a semiconductor material doped with n-type or p-type impurities. The electrode layer 37 may include a same material or may include different materials. However, the disclosure is not limited thereto.

The insulating film 38 may be adjacent to (e.g., surround) the outer surfaces of the semiconductor layers (e.g., the first semiconductor layer 31, the second semiconductor layer 32, and the active layer 36) and electrode layers described above. According to an embodiment of the disclosure, the insulating film 38 may be adjacent to (e.g., surround) at least the outer surface of the active layer 36, and may be extended in a direction in which the light-emitting element 30 is extended. The insulating film 38 may protect the above-described elements. For example, the insulating film 38 may be adjacent to (e.g., surround) the side surfaces of the elements (e.g., the semiconductor layers and the electrode layer), and the ends (e.g., both ends) of the light-emitting element 30 in the longitudinal direction may be exposed.

Although the insulating film 38 is extended in the longitudinal direction of the light-emitting element 30 to cover from the first semiconductor layer 31 to the side surface of the electrode layer 37 (e.g., to cover the side surfaces or the outer surfaces of the first semiconductor layer 31, the active layer 36, the second semiconductor layer 32, and the electrode layer 37) in the example shown in the drawing, the disclosure is not limited thereto. The insulating film 38 may cover only the outer surface of a part of the semiconductor layer, including the active layer 36, or may cover only a part of the outer surface of the electrode layer 37 to partially expose the outer surface of the electrode layer 37. A part of the upper surface of the insulating film 38 may be rounded which is adjacent to at least one end of the light-emitting element 30 in a cross-sectional view.

A thickness of the insulating film 38 may be in a range of about 10 nm to about 1.0 μm. For example, the thickness of the insulating film 38 may be about 40 nm. However, the disclosure is not limited thereto.

The insulating film 38 may include materials having an insulating property such as silicon oxide (SiOx), silicon nitride (SiNx), silicon oxynitride (SiOxNy), aluminum nitride (AlN), and aluminum oxide ($Al_2O_3$). Accordingly, it is possible to prevent an electrical short-circuit that may occur in case that the active layer 36 comes in contact with an electrode through which an electric signal is transmitted to the light-emitting element 30. Since the insulating film 38 may protect the outer surface of the light-emitting element 30 including the active layer 36, it is possible to prevent a decrease in luminous efficiency.

In some embodiments, the outer surface of the insulating film 38 may be subjected to a surface treatment. The light-emitting elements 30 may be dispersed in an ink 90 and the ink 90 may be sprayed onto the electrodes (e.g., the first electrode 21 and the second electrode 22). Thus, the light-emitting elements 30 may be aligned on the electrodes during the process of fabricating the display device 10. In doing so, a surface treatment may be applied to the insulating film 38 so that it becomes hydrophobic or hydrophilic in order to keep the light-emitting elements 30 dispersed in the ink 90 from being aggregated with one another.

A length h of the light-emitting element 30 may be in a range of about 1 μm to about 10 μm or from about 2 μm to about 6 μm. For example, the length h of the light-emitting element 30 may be in a range of about 3 μm to about 5 μm. A diameter of the light-emitting elements 30 may be in a range of about 30 nm to about 700 nm, and an aspect ratio of the light-emitting elements 30 may be in a range of about 1.2 to about 100. However, the disclosure is not limited thereto. The light-emitting elements 30 included in the display device 10 may have different diameters depending on compositional difference of the active layer 36. For example, the diameter of the light-emitting elements 30 may be about 500 nm.

The light-emitting elements 30 according to an embodiment of the disclosure may include an active layer 36 including different materials to emit light of different wavelength bands to the outside. In the display device 10, the light-emitting elements 30 of the first sub-pixel PX1 may emit a first light having a central wavelength band of a first wavelength, the light-emitting elements 30 of the second sub-pixel PX2 may emit a second light having a central wavelength band of a second wavelength, and the light-emitting elements 30 of the third sub-pixel PX3 may emit a third light having a central wavelength band of a third wavelength. Accordingly, the first light may be output from the first sub-pixel PX1, the second light may be output from the second sub-pixel PX2, and the third light may be output from the third sub-pixel PX3. In some embodiments, the first light may be blue light having a central wavelength band in a range of about 450 nm to about 495 nm, the second light may be green light having a central wavelength band in a range of about 495 nm to about 570 nm, and the third light may be red light having a central wavelength band in a range of about 620 nm to about 750 nm. However, the disclosure is not limited thereto.

Although FIG. 17 shows only the cross-section of the first sub-pixel PX1, the description may be equally applied to other pixels PX or sub-pixels PXn. FIG. 17 shows the cross-section passing through a first end to a second end of a light-emitting element 30 disposed in a first sub-pixel PX1.

For example, although not shown in FIG. 17, the display device 10 may further include a circuit element layer positioned under each of the electrodes 21 and 22. The circuit element layer may include semiconductor layers and conductive patterns, and may include at least one transistor and a power supply line. Detailed description of the elements in the circuit element layer is provided below.

Referring to FIGS. 15 and 17, the display device 10 may include a first insulating layer 51, electrodes 21 and 22 disposed on the first insulating layer 51, light-emitting elements 30, etc. A circuit element layer (not shown) may be further disposed under the first insulating layer 51. The first insulating layer 51 may include an organic insulating material to provide a flat surface.

Inner banks 41 and 42, an outer bank 43, electrodes 21 and 22, and the light-emitting element 30 may be disposed on the first insulating layer 51.

In the processes of fabricating the display device 10, in case that the ink 90 in which the light-emitting elements 30 are dispersed is sprayed using the above-described inkjet printing apparatus 1 of FIG. 1, the outer bank 43 may prevent the ink 90 from flowing over the boundaries of the sub-pixels PXn (e.g., the boundaries between adjacent ones of the sub-pixels PXn). The outer bank 43 may separate the different sub-pixels PXn from one another so that the ink 90 of the different sub-pixels PXn in which the light-emitting elements 30 are dispersed may not be mixed with each other. However, the disclosure is not limited thereto.

The inner banks 41 and 42 may include a first inner bank 41 and a second inner bank 42 disposed adjacent to the center of each of the sub-pixels PXn.

The first inner bank 41 and the second inner bank 42 may be spaced apart from each other. The first electrode 21 may be disposed on the first inner bank 41, and the second electrode 22 may be disposed on the second inner bank 42. Referring to FIGS. 15 and 17, the first electrode branch 21B may be disposed on the first inner bank 41 and the second electrode branch 22B may be disposed on the second inner bank 42.

The first inner bank 41 and the second inner bank 42 may be disposed in each of the sub-pixels PXn, and the first inner bank 41 and the second inner bank 42 may be extended in the vertical direction. However, the disclosure is not limited thereto. The first inner bank 41 and the second inner bank 42 may be disposed in each of the sub-pixels PXn and form a pattern on a front surface of the display device 1. The inner banks 41 and 42 and the outer banks 43 may include polyimide (PI). However, the disclosure is not limited thereto.

The first inner bank 41 and the second inner bank 42 may have a structure that at least partially protrudes from the first insulating layer 51. The first inner bank 41 and the second inner bank 42 may protrude upwardly from the plane on which the light-emitting elements 30 are disposed, and at least a part of the protruding portions of the first inner bank 41 and the second inner bank 42 may have an inclination. Since the inner banks 41 and 42 have inclined sides that protrude from the first insulating layer 51, the light emitted from the light-emitting elements 30 may be reflected off the inclined sides of the inner banks 41 and 42. As will be described below, if the electrodes 21 and 22 disposed on the inner banks 41 and 42, respectively, may include a material having high reflectivity, and the light emitted from the light-emitting elements 30 may be reflected off the electrodes 21 and 22 so that the light may travel toward an upper side of the first insulating layer 51.

The outer bank 43 may be disposed at the boundary of each of the sub-pixels PXn and form a grid pattern, and the inner banks 41 and 42 may be disposed within each of the sub-pixels PXn and extended in a direction.

The electrodes 21 and 22 may be disposed on the first insulating layer 51 and the inner banks 41 and 42. As described above, the electrodes 21 and 22 may include electrode stems 21S and 22S and electrode branches 21B and 22B, respectively.

The first electrode 21 and the second electrode 22 may be partially disposed on the first insulating layer 51 and may be partially disposed on the first inner bank 41 and the second inner bank 42. As described above, the first electrode stem 21S of the first electrode 21 and the second electrode stem 22S of the second electrode 22 may be extended in the horizontal direction. The first inner bank 41 and the second inner bank 42 may be extended in the vertical direction and may also be disposed in adjacent sub-pixels PXn in the vertical direction.

The first electrode contact hole CNTD may penetrate through the first insulating layer 51 and expose a part of the circuit element layer. The first electrode contact hole CNTD may be formed in the first electrode stem 21S of the first electrode 21. The first electrode 21 may be electrically connected to a transistor of the circuit element layer through the first electrode contact hole CNTD. An electric signal may be transmitted from the transistor to the first electrode 21.

The second electrode stem 22S of the second electrode 22 may be extended in a direction and may be disposed in the non-emission area in which the light-emitting elements 30 are not disposed. The second electrode contact hole CNTS may penetrate through the first insulating layer 51 and expose the part of the circuit element layer. The second electrode contact hole CNTS may be formed in the second electrode stem 22S. The second electrode 22 may be electrically connected to a power electrode via the second electrode contact hole CNTS. An electric signal may be transmitted from the power electrode to the second electrode 22.

Parts of the first electrode 21 and the second electrode 22 (e.g., the first electrode branch 21B and the second electrode branch 22B) may be disposed in the first inner bank 41 and the second inner bank 42, respectively. The light-emitting elements 30 may be disposed in a region between the first electrode 21 and the second electrode 22. For example, the light-emitting elements 30 may be disposed in a space in which the first electrode branch 21B and the second electrode branch 22B are spaced apart from and face each other.

Each of the electrodes 21 and 22 may include a transparent conductive material. For example, each of the electrode layers 21 and 22 may include a material such as indium tin oxide (ITO), indium zinc oxide (IZO), and indium tin zinc oxide (ITZO). However, the disclosure is not limited thereto. In some embodiments, each of the electrodes 21 and 22 may include a conductive material having a high reflectivity. For example, each of the electrodes 21 and 22 may include a metal such as silver (Ag), copper (Cu), and aluminum (Al) as the material having a high reflectivity. Light incident on each of the electrodes 21 and 22 may be reflected and exit toward an upper side of each of the sub-pixels PXn.

Each of the electrodes 21 and 22 may have a structure in which one or more layers of a transparent conductive material and a metal layer having high reflectivity are stacked each other. In other embodiments, each of the electrodes 21 and 22 may be made up of a single layer including at least one of the transparent conductive material and the metal. In an embodiment, each of the electrodes 21 and 22 may have a stack structure of ITO/silver (Ag)/ITO/IZO. In other embodiments, each of the electrodes 21 and 22 may be an alloy including at least one of aluminum (Al), nickel (Ni), and lanthanum (La). However, the disclosure is not limited thereto.

The second insulating layer 52 may be disposed on the first insulating layer 51, the first electrode 21, and the second electrode 22. The second insulating layer 52 may be disposed to partially cover the first electrode 21 and the second electrode 22. The second insulating layer 52 may cover the upper surface (e.g., most of the upper surface) of each of the first electrode 21 and the second electrode 22. The second insulating layer 52 may expose a part of each of the first electrode 21 and the second electrode 22. The second insulating layer 52 may be disposed to expose a part of the upper surfaces of the first electrode 21 and the second electrode 22. For example, the second insulating layer 52 may expose a part of the upper surface of the first electrode branch 21B disposed on the first inner bank 41 and the upper surface of the second electrode branch 22B disposed on the inner bank 42. For example, the second insulating layer 52 may be formed substantially entirely on the first insulating layer 51, and may include an opening partially exposing the first electrode 21 and the second electrode 22.

In an embodiment, the second insulating layer 52 may have a step (e.g., a step difference, thickness difference, or height difference) so that a part of the upper surface of the second insulating layer 52 is recessed between the first electrode 21 and the second electrode 22. In some embodiments, the second insulating layer 52 may include an inorganic insulating material, and a part of the upper surface of the second insulating layer 52 disposed to cover the first electrode 21 and the second electrode 22 may be recessed due to the step of the elements disposed under the second insulating layer 52. The light-emitting elements 30 may be disposed on the second insulating layer 52 between the first electrode 21 and the second electrode 22 and form an empty space with the recessed upper surface of the second insulating layer 52. The light-emitting elements 30 may be partially spaced apart from the upper surface of the second insulating layer 52, and the space may be filled with a material of the third insulating layer 53. Detailed description of the third insulating layer 53 is provided below. However, the disclosure is not limited thereto. The second insulating layer 52 may form a flat upper surface, and the light-emitting element 30 may be disposed on the second insulating layer 53.

The second insulating layer 52 may protect the first electrode 21 and the second electrode 22 and electrically insulate from one other. The second insulating layer 52 may prevent the light-emitting element 30 disposed thereon from being brought into contact with other elements and damaged. However, the shape and structure of the second insulating layer 52 are not limited thereto.

The light-emitting elements 30 may be disposed on the second insulating layer 52 between the electrodes 21 and 22. For example, at least one light-emitting element 30 may be disposed on the second insulating layer 52 disposed between the electrode branches 21B and 22B. However, the disclosure is not limited thereto. Although not shown in the drawings, at least some of the light-emitting elements 30 may be disposed in each of the sub-pixels PXn. For example, the at least some of the light-emitting elements 30 may be disposed in other regions out of a region between the electrode branches 21B and 22B. The light-emitting elements 30 may be disposed on ends of the first electrode branch 21B and the second electrode branch 22B facing each other. The light-emitting elements 30 may be electrically connected to the electrodes 21 and 22 through the contact electrodes 26.

In each of the light-emitting elements 30, multiple layers may be disposed in a direction parallel to the first insulating layer 51. A light-emitting element 30 of the display device 10 according to an embodiment may have a shape extended in a direction and may have a structure in which multiple semiconductor layers are sequentially disposed in the direction. As described above, in the light-emitting element 30, the first semiconductor layer 31, the active layer 36, the second semiconductor layer 32, and the electrode layer 37 may be sequentially disposed in the direction, and the outer surfaces thereof may be surrounded by the insulating film 38. The light-emitting elements 30 of the display device 10 may be arranged such that they are extended in parallel to the first insulating layer 51. The semiconductor layers included in the light-emitting elements 30 may be disposed sequentially in the direction parallel to the upper surface of the first insulating layer 51. However, the disclosure is not limited thereto. In some embodiments, in case that the light-emitting elements 30 have a different structure, layers of the light-emitting elements 30 may be disposed in the direction perpendicular to the first insulating layer 51.

The end of each of the light-emitting elements 30 may be in contact with a first contact electrode 26*a*, and the another end thereof may be in contact with a second contact electrode 26*b*. According to an embodiment of the disclosure, no insulating film is formed on an end surface of the light-emitting element 30 on a side in the extension direction, and the end surface of the light-emitting element 30 may be exposed. Thus, the exposed end surface of the light-emitting element 30 may be in contact with the first contact electrode 26*a* and the second contact electrode 26*b*. Detailed description of the first contact electrode 26*a* and the second contact electrode 26*b* is provided below. However, the disclosure is not limited thereto. In some implementations, the insulating film 38 of the light-emitting element 30 may be removed at least partially, and the end surfaces (e.g., both end surfaces) of the light-emitting element 30 may be partially exposed.

The third insulating layer 53 may be partially disposed on the light-emitting elements 30 disposed between the first electrode 21 and the second electrode 22. The third insulating layer 53 may be disposed to partially surround the outer surface of the light-emitting elements 30. The third insulating layer 53 may protect the light-emitting elements 30 and fix the light-emitting elements 30 during the process of fabricating the display device 10. According to an embodiment of the disclosure, a part of the material of the third insulating layer 53 may be disposed between a lower surface of the light-emitting element 30 and the second insulating layer 52. As described above, the third insulating layer 53 may be formed to fill the space between the second insulating layer 52 and the light-emitting elements 30 formed during the process of fabricating the display device 10. Accordingly, the third insulating layer 53 may be formed to surround the outer surface of the light-emitting element 30. However, the disclosure is not limited thereto.

The third insulating layer 53 may be extended in the vertical direction between the first electrode branch 21B and the second electrode branch 22B in a plan view. For example, the third insulating layer 53 may have an island shape or a linear shape on the first insulating layer 51 in a plan view. According to an embodiment of the disclosure, the third insulating layer 53 may be disposed on the light-emitting elements 30.

The first contact electrode 26*a* and the second contact electrode 26*b* may be disposed on the electrodes 21 and 22, respectively, and the third insulating layer 53. For example, the first contact electrode 26*a* may be disposed on the first electrode 21 and the third insulating layer 53, and the second contact electrode 26*b* may be disposed on the second electrode 22 and the third insulating layer 53. The first contact electrode 26*a* and the second contact electrode 26*b* may be disposed on the third insulating layer 53, and the first contact electrode 26*a* and the second contact electrode 26*b* may be spaced apart from each other. The third insulating layer 53 may electrically insulate the first contact electrode 26*a* from the second contact electrode 26*b*, and the first contact electrode 26*a* and the second contact electrode 26*b* may not be in direct contact with each other.

The first contact electrode 26*a* may be in contact with an exposed partial region of the first electrode 21 on the first inner bank 41, and the second contact electrode 26*b* may be in contact with an exposed partial region of the second electrode 22 on the second inner bank 42. The first contact electrode 26*a* and the second contact electrode 26*b* may transmit electrical signals transmitted from the respective electrodes 21 and 22 to the light-emitting elements 30.

The contact electrodes 26 may include a conductive material. For example, the connection electrodes CNE may include ITO, IZO, ITZO, aluminum (Al), etc. However, the disclosure is not limited thereto.

A passivation layer 55 may be disposed on the contact electrode 26 and the third insulating layer 53. The passivation layer 55 may protect the elements (e.g., the light-emitting elements 30) disposed on the first insulating layer 51 from external environments.

Each of the second insulating layer 52, the third insulating layer 53, and the passivation layer 55 may include an inorganic insulating material or an organic insulating material. According to an embodiment of the disclosure, the second insulating layer 52, the third insulating layer 53, and the passivation layer 55 may include an inorganic insulating material such as silicon oxide (SiOx), silicon nitride (SiNx), silicon oxynitride (SiOxNy), aluminum oxide ($Al_2O_3$), and aluminum nitride (AlN). The second insulating layer 52, the third insulating layer 53, and the passivation layer 55 may include, as an organic insulating material, an acrylic resin, an epoxy resin, a phenol resin, a polyamide resin, a polyimide resin, an unsaturated polyester resin, a polyphenylene resin, a polyphenylene sulfide resin, benzocyclobutene, a cardo resin, a siloxane resin, a silsesquioxane resin, polymethyl methacrylate, polycarbonate, a polymethyl methacrylate-polycarbonate synthetic resin, etc. However, the disclosure is not limited thereto.

Referring to FIGS. 18 to 20, the display device 10 according to an embodiment may be fabricated using the inkjet printing apparatus 1 described above with reference to FIG. 1. The inkjet printing apparatus 1 may eject the ink 90 in which the light-emitting elements 30 are dispersed, and the light-emitting elements 30 may be disposed between the first electrode 21 and the second electrode 22 of the display device 10.

Initially, as shown in FIG. 18, a first insulating layer 51, a first inner bank 41 and a second inner bank 42 spaced apart from each other on the first insulating layer 51, a first electrode 21 and a second electrode 22 disposed on the inner bank 41 and the second inner bank 42, respectively, and a second insulating material layer 52' covering the first electrode 21 and the second electrode 22 are prepared. The second insulating material layer 52' may be partially patterned in a subsequent process to form the second insulating layer 52 of the display device 10. The above elements may be formed by patterning a metal, an inorganic material, an organic material, etc. via mask processes.

The ink 90 in which the light-emitting elements 30 are dispersed may be sprayed onto the first electrode 21 and the second electrode 22. The light-emitting elements 30 may be a kind of the bipolar elements 95. The injection of the ink 90 in which the light-emitting elements 30 are dispersed may be carried out by using the above-described inkjet printing apparatus 1 and a method of printing the bipolar elements 95. As shown in the drawing, the inkjet printing apparatus 1 according to the embodiment may discharge the ink 90 in which a uniform number of light-emitting elements 30 are dispersed. Description of the discharging of the ink 90 has been described above; and, therefore, the repetitive descriptions will be omitted.

Subsequently, as shown in FIG. 19, an electric signal may be applied to the first electrode 21 and the second electrode 22 and generate an electric field IEL in the ink 90 in which the light-emitting elements 30 are dispersed. The light-emitting elements 30 may be seated between the first electrode 21 and the second electrode 22 as the dielectrophoretic force is transmitted by the electric field IEL and the orientations and positions are changed.

Subsequently, as shown in FIG. 20, the solvent 91 of the ink 90 may be removed. The light-emitting elements 30 may be disposed between the first electrode 21 and the second electrode 22 via the above-described processes. Subsequently, although not shown in the drawings, the second insulating material layer 52' may be patterned to form the second insulating layer 52, and a third insulating layer 53, a first contact electrode 26*a* and a second contact electrode 26*b*, and a passivation layer 55 (e.g., refer to FIG. 17) may be formed, so that a display device can be fabricated.

The shape and material of the light-emitting elements 30 are not limited to those described with reference to FIG. 16. In some embodiments, the light-emitting elements 30 may include a greater number of layers or may have different shapes.

Hereinafter, a modification of the inkjet printing apparatus 1 according to the embodiment is described below. In the following description, the same or similar elements will be denoted by the same or similar reference numerals, and repetitive descriptions will be omitted or briefly described.

Figure 21:
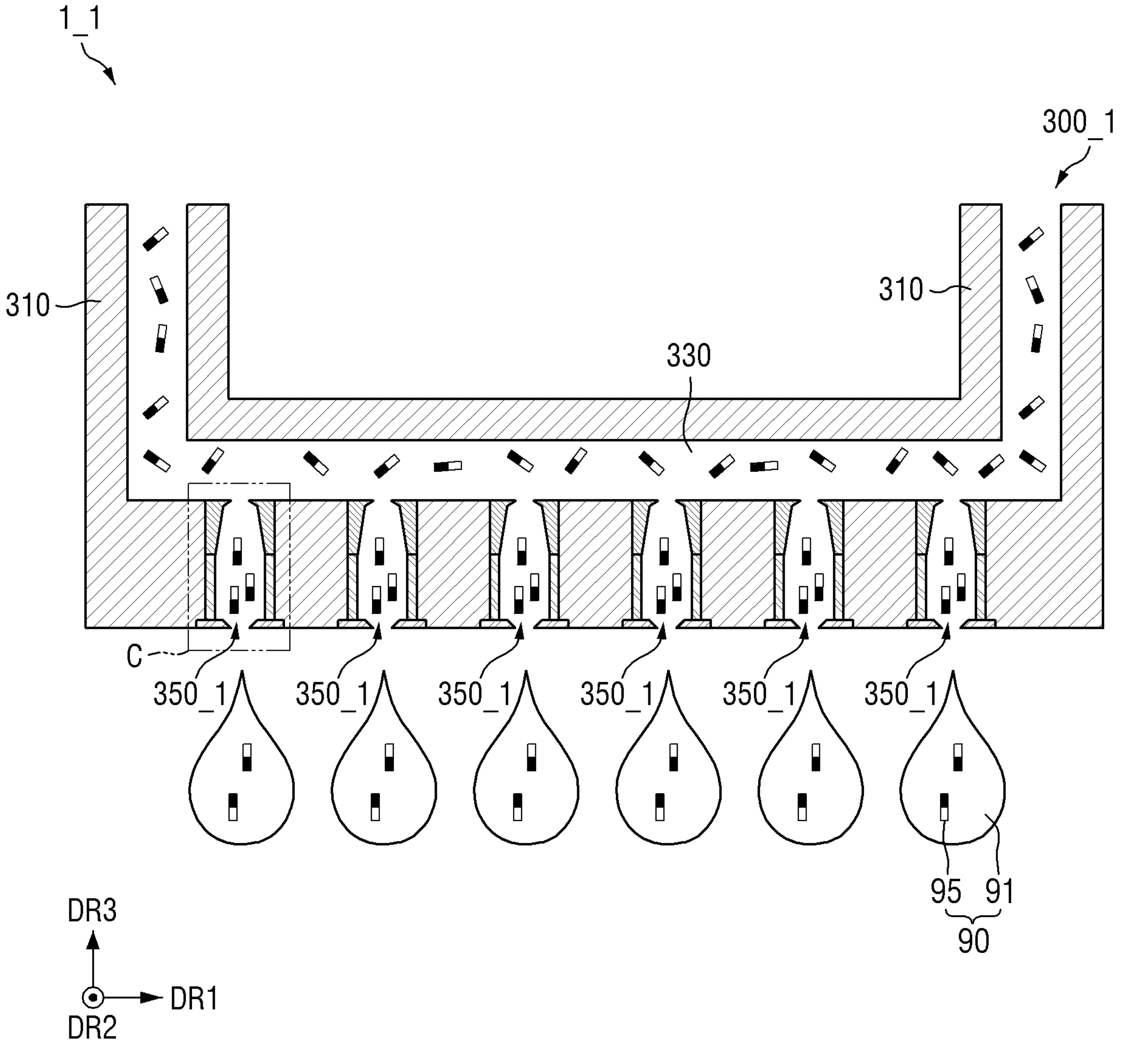
FIG. 21 is a view schematically showing a structure of an inside of an inkjet head unit of an inkjet printing apparatus according to another embodiment.
Figure 22:
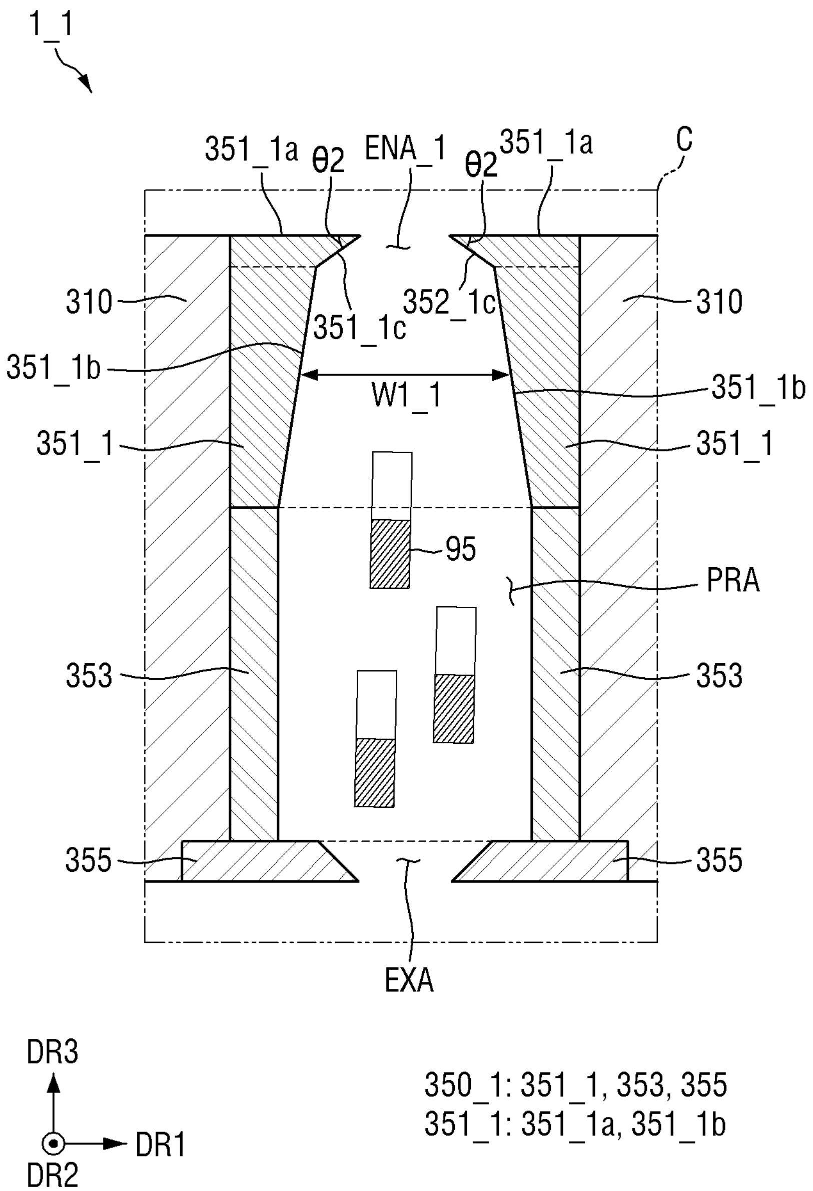
FIG. 22 is a schematic enlarged view of area C of FIG. 21.

FIG. 21 is a view schematically showing a structure of an inside of an inkjet head part of an inkjet printing apparatus according to another embodiment. FIG. 22 is a schematic enlarged view of area C of FIG. 21.

In the example shown in FIGS. 21 and 22, in an inkjet printing apparatus 1_1 according to this embodiment, an entrance of an inlet 351_1 of each of injection holes 350_1 may have a shape with multiple angles. For example, according to this embodiment, the inlet 351_1 may have multiple inclined surfaces 351_1*b* and 351_1*c*.

According to this embodiment, the inlet 351_1 may include a flat surface 351_1*a* as a surface in the third direction DR3, and a first inclined surface 351_1*b* and a second inclined surface 351_1*c* as surfaces surrounding an entrance area ENA_1. The second inclined surface 351_*c* may be more inclined toward the entrance area ENA_1 than the first inclined surface 351_*b*. The flat surface 351_1*a* of the inlet 351_1 according to the embodiment is substantially identical to the flat surface 351*a* of the inlet 351 of the inkjet printing apparatus 1 according to the above-described embodiment; and, therefore, the repetitive descriptions will be omitted.

The flat surface 351_1*a* may intersect the second inclined surface 351_1*c* at a second angle θ2 that is an acute angle. The first inclined surface 351_1*b* and the second inclined surface 351_1*c* may intersect each other. The first inclined surface 351_1*b* and the second inclined surface 351_1*c* may be inclined at different angles. For example, an end of the second inclined surface 351_1*c* may be in contact with the flat surface 351_1*a*, and another end of the second inclined surface 351_1*c* may be in contact with the first inclined surface 351_1*b*. The first inclined surface 351_1*b* may form an acute angle with the direction parallel to the flat surface 351_1*a*. For example, the first inclined surface 351_1*b* may form an acute angle with an imaginary surface parallel to the first direction DR1.

As the second inclined surface 351_1*c* is inclined at the second angle θ2 that is an acute angle with respect to the flat surface 351_1*a*, and the first inclined surface 351_1*b* is in contact with the opposite end of the second inclined surface 351_1*c*, i.e., it is inclined at an acute angle with an imaginary surface parallel to the first direction DR1, the first inclined surface 351_1*b* and the second inclined surface 351_1*c* may not be exposed from the entrance area ENA_1 when the entrance area ENA_1 is viewed in the third direction DR3. For example, an area of an end of the entrance area ENA_1 in the third direction DR3 may be smaller than an area of an opposite end of the entrance area ENA in the third direction DR3. Accordingly, in case that the bipolar elements 95 are introduced into the entrance area ENA_1, the bipolar elements 95 may not be accumulated on the inlet 351_1, so that the lifetime of the nozzle parts 300 may be improved.

Since the first inclined surface 351_1*b* and the second inclined surface 351_1*c* are inclined at different angles, the width W1_1 of the entrance area ENA_1 may increase toward the opposite side in the third direction DR3, and a rate of change of the width W1_1 of the entrance area ENA_1 in the third direction DR3 may vary from a point where the first inclined surface 351_1*b* and the second inclined surface 351_1*c* come into contact with each other. This is due to the process of forming the inlet 351_1 in which the entrance area ENA_1 is defined. For example, the inlet 351_1 in which the entrance area ENA_1 is not formed may be processed and form the entrance area ENA_1. The process of processing the inlet 351_1 to form the entrance area ENA_1 may be carried out, for example, by dry etching or wet etching.

For example, the process of processing the inlet 351_1 to form the entrance area ENA_1 may include forming the first inclined surface 351_1*b* (e.g., primary processing) and forming the second inclined surface 351_1*c* (e.g., secondary processing). When the second inclined surface 351_1*c* is formed after the first inclined surface 351_1*b* is formed, the thickness of the inlet 351_1 to be processed to form the second inclined surface 351_1*c* may be reduced. Thus, the entrance area ENA_1 may be readily formed.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An inkjet printing apparatus comprising:
a stage on which a substrate is seated;
a nozzle part disposed above the stage and spraying an ink onto the substrate, the ink containing a solvent and solid substances; and
a head part that supplies the ink to the nozzle part, wherein the nozzle part includes:
an internal flow path extended in a first direction, through which the ink is supplied from the head part; and
an inlet in which an entrance area is defined,
the internal flow path is arranged to cause the ink to be introduced in a second direction intersecting the first direction from the internal flow path through the entrance area,
the inlet includes:
an inclined surface adjacent to the entrance area and defining the entrance area; and
a flat surface parallel to the first direction, the flat surface in contact with an end of the incline surface, and
an angle of the inlet between the inclined surface and the flat surface where the flat surface contacts the incline surface is an acute angle.

2. The apparatus of claim 1, wherein the nozzle part further comprises:
a pressure part disposed adjacent to the inlet in the second direction and defining a pressure area that supplies a pressure to the ink introduced from the entrance area.

3. The apparatus of claim 2, wherein the pressure part comprises a piezoelectric element.

4. The apparatus of claim 3, further comprising:
an outlet adjacent to the pressure part in the second direction to define an exit area,
wherein the ink is discharged from the exit area by the pressure applied in the pressure area.

5. The apparatus of claim 4, wherein a width of the entrance area defined along the first direction increases as distance from where the flat surface contacts the incline surface along the second direction increases.

6. The apparatus of claim 5, wherein
the entrance area comprises:
an end adjacent to the internal flow path; and
an opposite end adjacent to the pressure area, and
an area of the end of the entrance area is smaller than an area of the opposite end of the entrance area.

7. The apparatus of claim 6, wherein the ink sequentially passes through the internal flow path, the entrance area, the pressure area, and the exit area.

8. The apparatus of claim 1, wherein the nozzle part further comprises a base in which the internal flow path and the inlet are located.

9. The apparatus of claim 8, wherein the internal flow path penetrates through the base.

10. The apparatus of claim 9, wherein an edge of the internal flow path is defined by the base and the flat surface of the inlet.

11. The apparatus of claim 1, wherein the inclined surface comprises:
a first inclined surface having:
an end in contact with the flat surface; and
an opposite end; and
a second inclined surface in contact with the opposite end of the first inclined surface.

12. The apparatus of claim 11, wherein the first inclined surface is more inclined toward the entrance area than the second inclined surface.

* * * * *